United States Patent [19]

Dischert et al.

[11] Patent Number: 4,779,144
[45] Date of Patent: Oct. 18, 1988

[54] IMAGE STORAGE USING SEPARATELY SCANNED LUMINANCE-DETAIL AND NARROWBAND COLOR-COMPONENT VARIABLES

[75] Inventors: Robert A. Dischert, Burlington; David L. Sprague, Hopewell; Lawrence D. Ryan, Princeton Junction; Nicola J. Fedele, Kingston, all of N.J.

[73] Assignee: Technology Inc., 64, Princeton, N.J.

[21] Appl. No.: 20,940

[22] Filed: Mar. 2, 1987

[51] Int. Cl.$^4$ .............................................. H04N 9/491
[52] U.S. Cl. ........................................ 358/334; 358/13
[58] Field of Search ...................... 358/310, 11, 12, 13, 358/15, 334, 335; 360/9.1

[56] References Cited

U.S. PATENT DOCUMENTS

| | | | |
|---|---|---|---|
| 2,554,693 | 5/1951 | Bedford | 358/15 |
| 2,635,140 | 4/1953 | Dome | 358/15 |
| 4,210,927 | 7/1980 | Yumde et al. | 358/12 |
| 4,303,947 | 12/1981 | Stoffel | 358/260 |
| 4,428,059 | 1/1984 | Gessert | 364/577 |
| 4,520,386 | 5/1985 | Asaida | 358/13 |
| 4,531,151 | 7/1985 | Hentschke | 358/135 |
| 4,625,230 | 11/1986 | Tan et al. | 358/11 |
| 4,633,295 | 12/1986 | van de Polder et al. | 358/12 |
| 4,694,414 | 9/1987 | Christopher | 364/724 |
| 4,719,503 | 1/1988 | Craver et al. | 358/13 X |

OTHER PUBLICATIONS

I. G. Brown, "Primary Signal Component Coding", 1980 International Broadcasting Convention Conf., Pub. 191, pp. 344-349.
M. F. Cowlishaw, "Fundamental Requirements of Picture Presentation", *Proceedings of the SID*, vol. 26/2, 1985, pp. 105-107.
D. E. Troxel et al., "A Two-Channel Picture Coding System: I-Real-Time Implementation", *IEEE Transactions On Communications*, vol. COM-29, No. 12, Dec. 1981, pp. 1841-1848.

*Primary Examiner*—L. T. Hix
*Assistant Examiner*—D. Rutledge
*Attorney, Agent, or Firm*—Allen L. Limberg; Joseph S. Tripoli; Fred Jacob

[57] ABSTRACT

Computer main memory is used for storing relatively densely sampled luminance detail information concerning a television display and for storing relatively sparsely sampled narrowband color-component information concerning the same television display. The relatively densely sampled luminance detail information is read out in substantially real-time from computer main memory during line trace intervals in the television display. The relatively sparsely sampled narrowband color-component information is read out of computer main memory in advanced and compressed time during selected line retrace intervals in the television display.

38 Claims, 16 Drawing Sheets

| 1ST LUMINANCE DETAIL SCAN LINE | | | |
|---|---|---|---|
| 2ND LUMINANCE DETAIL SCAN LINE | | | |

(4P−3) ROWS

| 4PTH LUMINANCE DETAIL SCAN LINE | | | |
|---|---|---|---|
| (4P+1)TH LUMINANCE DETAIL SCAN LINE | | | |
| 1ST $N_1$ SCAN LINE | 2ND $N_1$ SCAN LINE | 3RD $N_1$ SCAN LINE | 4TH $N_1$ SCAN LINE |
| 5TH $N_1$ SCAN LINE | 6TH $N_1$ SCAN LINE | 7TH $N_1$ SCAN LINE | 8TH $N_1$ SCAN LINE |

[(P−15)/4 ROWS]

| (P−6)TH $N_1$ SCAN LINE | (P−5)TH $N_1$ SCAN LINE | (P−4)TH $N_1$ SCAN LINE | (P−3)TH $N_1$ SCAN LINE |
|---|---|---|---|
| (P−2)TH $N_1$ SCAN LINE | (P−1)TH $N_1$ SCAN LINE | PTH $N_1$ SCAN LINE | (P+1)TH $N_1$ SCAN LINE |
| 1ST $N_2$ SCAN LINE | 2ND $N_2$ SCAN LINE | 3RD $N_2$ SCAN LINE | 4TH $N_2$ SCAN LINE |
| 5TH $N_2$ SCAN LINE | 6TH $N_2$ SCAN LINE | 7TH $N_2$ SCAN LINE | 8TH $N_2$ SCAN LINE |

[(P−15)/4 ROWS]

| (P−6)TH $N_2$ SCAN LINE | (P−5)TH $N_2$ SCAN LINE | (P−4)TH $N_2$ SCAN LINE | (P−3)TH $N_2$ SCAN LINE |
|---|---|---|---|
| (P−2)TH $N_2$ SCAN LINE | (P−1)TH $N_2$ SCAN LINE | PTH $N_2$ SCAN LINE | (P+1)TH $N_2$ SCAN LINE |
| 1ST $N_3$ SCAN LINE | 2ND $N_3$ SCAN LINE | 3RD $N_3$ SCAN LINE | 4TH $N_3$ SCAN LINE |
| 5TH $N_3$ SCAN LINE | 6TH $N_3$ SCAN LINE | 7TH $N_3$ SCAN LINE | 8TH $N_3$ SCAN LINE |

[(P−15)/4 ROWS]

| (P−6)TH $N_3$ SCAN LINE | (P−5)TH $N_3$ SCAN LINE | (P−4)TH $N_3$ SCAN LINE | (P−3)TH $N_3$ SCAN LINE |
|---|---|---|---|
| (P−2)TH $N_3$ SCAN LINE | (P−1)TH $N_3$ SCAN LINE | PTH $N_3$ SCAN LINE | (P+1)TH $N_3$ SCAN LINE |

*Fig. 11*

| 1ST LUMINANCE DETAIL SCAN LINE | 2ND LUMINANCE DETAIL SCAN LINE |
|---|---|
| 3RD LUMINANCE DETAIL SCAN LINE | 4TH LUMINANCE DETAIL SCAN LINE |

(2P-3) ROWS

ODD FRAME:

| (4P-1)TH LUMINANCE DETAIL SCAN LINE | (4P)TH LUMINANCE DETAIL SCAN LINE |
|---|---|
| (4P+1)TH LUMINANCE DETAIL SCAN LINE | |

| 1ST $N_1$ S.L. | 1ST $N_2$ S.L. | 1ST $N_3$ S.L. | 2ND $N_1$ S.L. | 2ND $N_2$ S.L. | 2ND $N_3$ S.L. | 3RD $N_1$ S.L. | 3RD $N_2$ S.L. |
|---|---|---|---|---|---|---|---|
| 3RD $N_3$ S.L. | 4TH $N_1$ S.L. | 4TH $N_2$ S.L. | 4TH $N_3$ S.L. | 5TH $N_1$ S.L. | 5TH $N_2$ S.L. | 5TH $N_3$ S.L. | 6TH $N_1$ S.L. |

[(3P-31)/8] ROWS

| $(P-4)^{TH}N_3$ S.L. | $(P-3)^{TH}N_1$ S.L. | $(P-3)^{TH}N_2$ S.L. | $(P-3)^{TH}N_3$ S.L. | $(P-2)^{TH}N_1$ S.L. | $(P-2)^{TH}N_2$ S.L. | $(P-2)^{TH}N_3$ S.L. | $(P-1)^{TH}N_1$ S.L. |
|---|---|---|---|---|---|---|---|
| $(P-1)^{TH}N_2$ S.L. | $(P-1)^{TH}N_3$ S.L. | $P^{TH}N_1$ S.L. | $P^{TH}N_2$ S.L. | $P^{TH}N_3$ S.L. | $(P+1)^{TH}N_1$ S.L. | $(P+1)^{TH}N_2$ S.L. | $(P+1)^{TH}N_3$ S.L. |

EVEN FRAME:

| 1ST LUMINANCE DETAIL SCAN LINE | 2ND LUMINANCE DETAIL SCAN LINE |
|---|---|
| 3RD LUMINANCE DETAIL SCAN LINE | 4TH LUMINANCE DETAIL SCAN LINE |

(2P-3) ROWS

| (4P-1)TH LUMINANCE DETAIL SCAN LINE | (4P)TH LUMINANCE DETAIL SCAN LINE |
|---|---|
| (4P+1)TH LUMINANCE DETAIL SCAN LINE | |

| 1ST $N_1$ S.L. | 1ST $N_2$ S.L. | 1ST $N_3$ S.L. | 2ND $N_1$ S.L. | 2ND $N_2$ S.L. | 2ND $N_3$ S.L. | 3RD $N_1$ S.L. | 3RD $N_2$ S.L. |
|---|---|---|---|---|---|---|---|
| 3RD $N_3$ S.L. | 4TH $N_1$ S.L. | 4TH $N_2$ S.L. | 4TH $N_3$ S.L. | 5TH $N_1$ S.L. | 5TH $N_2$ S.L. | 5TH $N_3$ S.L. | 6TH $N_1$ S.L. |

[(3P-31)/8] ROWS

| $(P-4)^{TH}N_3$ S.L. | $(P-3)^{TH}N_1$ S.L. | $(P-3)^{TH}N_2$ S.L. | $(P-3)^{TH}N_3$ S.L. | $(P-2)^{TH}N_1$ S.L. | $(P-2)^{TH}N_2$ S.L. | $(P-2)^{TH}N_3$ S.L. | $(P-1)^{TH}N_1$ S.L. |
|---|---|---|---|---|---|---|---|
| $(P-1)^{TH}N_2$ S.L. | $(P-1)^{TH}N_3$ S.L. | $P^{TH}N_1$ S.L. | $P^{TH}N_2$ S.L. | $P^{TH}N_3$ S.L. | $(P+1)^{TH}N_1$ S.L. | $(P+1)^{TH}N_2$ S.L. | $(P+1)^{TH}N_3$ S.L. |

Fig. 13

| 1ST Y DETAIL SCAN LINE, ODD FRAME | 2ND Y DETAIL SCAN LINE, ODD FRAME |
|---|---|
| 3RD Y DETAIL SCAN LINE, ODD FRAME | 4TH Y DETAIL SCAN LINE, ODD FRAME |

| (4P-1)TH Y DETAIL SCAN LINE, ODD FRAME | 4PTH Y DETAIL SCAN LINE, ODD FRAME |
|---|---|
| (4P+1)TH Y DETAIL SCAN LINE, ODD FRAME | 1ST Y DETAIL SCAN LINE, EVEN FRAME |
| 2ND Y DETAIL SCAN LINE, EVEN FRAME | 3RD Y DETAIL SCAN LINE, EVEN FRAME |

ODD FRAME CHROMA

| (4P-2)TH Y DETAIL SCAN LINE, EVEN FRAME | | | | (4P-1)TH Y DETAIL SCAN LINE, EVEN FRAME | | | |
|---|---|---|---|---|---|---|---|
| 4PTH Y DETAIL SCAN LINE, EVEN FRAME | | | | (4P+1)TH Y DETAIL SCAN LINE, EVEN FRAME | | | |
| 1ST $N_1$ S.L. | 1ST $N_2$ S.L. | 1ST $N_3$ S.L. | 2ND $N_1$ S.L. | 2ND $N_2$ S.L. | 2ND $N_3$ S.L. | 3RD $N_1$ S.L. | 3RD $N_2$ S.L. |
| 3RD $N_3$ S.L. | 4TH $N_1$ S.L. | 4TH $N_2$ S.L. | 4TH $N_3$ S.L. | 5TH $N_1$ S.L. | 5TH $N_2$ S.L. | 5TH $N_3$ S.L. | 6TH $N_1$ S.L. |

| (P-4)TH $N_3$ S.L. | (P-3)TH $N_1$ S.L. | (P-3)TH $N_2$ S.L. | (P-3)TH $N_3$ S.L. | (P-2)TH $N_1$ S.L. | (P-2)TH $N_2$ S.L. | (P-2)TH $N_3$ S.L. | (P-1)TH $N_1$ S.L. |
|---|---|---|---|---|---|---|---|
| (P-1)TH $N_2$ S.L. | (P-1)TH $N_3$ S.L. | PTH $N_1$ S.L. | PTH $N_2$ S.L. | PTH $N_3$ S.L. | (P+1)TH $N_1$ S.L. | (P+1)TH $N_2$ S.L. | (P+1)TH $N_3$ S.L. |

EVEN FRAME CHROMA

| 1ST $N_1$ S.L. | 1ST $N_2$ S.L. | 1ST $N_3$ S.L. | 2ND $N_1$ S.L. | 2ND $N_2$ S.L. | 2ND $N_3$ S.L. | 3RD $N_1$ S.L. | 3RD $N_2$ S.L. |
|---|---|---|---|---|---|---|---|
| 3RD $N_3$ S.L. | 4TH $N_1$ S.L. | 4TH $N_2$ S.L. | 4TH $N_3$ S.L. | 5TH $N_1$ S.L. | 5TH $N_2$ S.L. | 5TH $N_3$ S.L. | 6TH $N_1$ S.L. |

| (P-4)TH $N_3$ S.L. | (P-3)TH $N_1$ S.L. | (P-3)TH $N_2$ S.L. | (P-3)TH $N_3$ S.L. | (P-2)TH $N_1$ S.L. | (P-2)TH $N_2$ S.L. | (P-2)TH $N_3$ S.L. | (P-1)TH $N_1$ S.L. |
|---|---|---|---|---|---|---|---|
| (P-1)TH $N_2$ S.L. | (P-1)TH $N_3$ S.L. | PTH $N_1$ S.L. | PTH $N_2$ S.L. | PTH $N_3$ S.L. | (P+1)TH $N_1$ S.L. | (P+1)TH $N_2$ S.L. | (P+1)TH $N_3$ S.L. |

*Fig. 14*

IMAGE STORAGE USING SEPARATELY SCANNED LUMINANCE-DETAIL AND NARROWBAND COLOR-COMPONENT VARIABLES

The invention relates to image storage in television display systems as may, by way of example, be used in computer apparatus.

BACKGROUND OF THE INVENTION

The graphic images used in computer-generated displays have been stored in image memories at address locations mapping respective points at regular intervals along the raster scanning of a display image space. Each addressed location in image memory has contained a digital word, at least a portion of which has encoded the brightness, hue and saturation of a color picture element (or "pixel") at the corresponding point in image space (and, in run-length encoding schemes, the value of succeeding pixels). A number of different schemes for encoding the brightness, hue and saturation of color pixels exist in the prior art.

One may analyze each color pixel as the sum of the three additive primary colors, red, green and blue, for example. The amplitudes of the red (R), green (G) and blue components may each be coded in a number n of bits, n normally being in the range five to eight inclusive. Coding may be linear, logarithmic, or in accordance with some other function. It is also known to linearly encode red, green and blue in different numbers p, q and r of bits depending on their relative contributions to luminance. Encoding green in seven bits, red in six bits and blue in five bits is an example of such coding, which provides luminance with nearly eight bits of amplitude resolution. There are 217 levels in luminance assuming it to be comprised of 59% green, 30% red and 11% blue in accordance with the NTSC standard. This compares favorably with the 219 levels in luminance for eight-bit coding of luminance using level 35 as black and level 254 as white, as recommended by the Society of Motion Picture and Television Engineers (SMPTE). This amplitude resolution in luminance ($Y=0.29R+0.59G+0.11B$) is generally considered to make quantization noise imperceptible to the human viewer. The reader is referred to M. F. Cowlishaw's paper "Fundamental Requirements of Picture Presentation" appearing on pages 101–107 of PROCEEDINGS OF THE SID, Vol. 26/2, 1985, for a comprehensive treatment of coding additive primary colors in differing numbers of bits.

One may analyze each color pixel as the sum of a luminance-only primary color and two chrominance-only primary colors. The luminance-only primary represents whiteness or brightness of the pixel. The chrominance-only primaries do not correspond with any real color, but together are representative of the difference of any real color from the luminance-only primary. Analyzing pixels in terms of luminance and two color-difference signals is usually done so that one may encode the two color-difference signals in less bandwidth than luminance. In digital sampled-data terms this usually corresponds to chrominance being sampled in image space at a subsampled rate compared to luminance being sampled in image space. Subsampling may be in the direction of line advance as well as in the direction in which scan lines extend.

A small computer may be used to decode television display material that has been encoded in an economical format (e.g., to permit the transmission of image data via telephone lines or the recording of image data on compact disc). Such image data is referred to as "compressed video". This small computer may be provided with general-purpose memory, portions of which are available for use as image memory to provide buffering between an irregular flow of received image data and the regular flow of image data to the display. It is desirable to provide an image memory configuration that is well suited to being used interchangeably with other data storage in general-purpose memory and does not require the use of dedicated portions of the memory for image storage.

The encoding of television information for transmission over media of such limited bandwidths as those available from a telephone line or compact disc forces the designer to resort to powerful video compression methods. These methods rely upon transmitting as little new image information per frame as possible and upon storing as much old image information as possible; and transmission of new image information cannot be done, at least not entirely, in real time. In order to write a display in real time, then, it is essential then to have frame buffer storage memory with the capability of storing at least two frames of video information. Such memory can be written to from a flow of compressed image data received in non-real time and read from so as to supply the display apparatus with a regular flow of image data in real time. The frames of stored information are updated on one frame and used to support display on the next, in staggered phasing. The frame buffer storage memory is bit-map-organized for convenience in constructing updated images from previous image data in accordance with instructions included in the compressed video data.

Image memories, the addressable storage locations of which map corresponding picture elements or "pixels" on a display screen and which store single bits descriptive of whether those corresponding pixels are bright or dark, have been described as being "bit-map-organized" for many years. In recent years the term "bit-map-organized" has been applied to certain image memories in which a pixel variable related to brightness is not expressed in terms of a single bit, but rather in terms of a plurality of bits. Such brightness-related variables may be luminance variables or may be color-difference variables used in connection with describing color displays, for example; or they may be component color variables, as another example. The term "bit-map-organized" has been extended to refer to two different memory configurations, each storing a plural-bit value descriptive of a pixel variable.

A plural-bit-variable bit-map-organized image memory of a first general type known in the prior art can be thought of as employing a number of planes, which number equals the total number of bits in the plural-bit-variable(s) describing a single pixel. The most significant bits of a first of the pixel variables are stored in the first bit plane at storage locations having respective addresses mapping respective pixel locations in the display; the next most significant bits of the first pixel variable are stored in the second bit plane at storage locations having respective addresses mapping respective pixel locations in the display in a manner corresponding to the mapping of the storage locations in the first bit plane; and so forth, proceeding to less significant bits in the first pixel variable, then proceeding through the bits of each other pixel variable (if any) proceeding from most significant to least significant bit. Responsive to a single address this type of memory furnishes simultaneously the respective plural bits of all the pixel variables descriptive of a particular pixel. Essentially, the spatial positions of individual pixels in the display have a one-to-one correspondence with respective image memory addresses, in a spatial mapping. This spatial mapping is held together by the tracing of the display screen and scanning of image memory addresses each being done in accordance with a prescribed pattern of correspondence between these activities. As long as the pattern of correspondence between these activities is adhered to, the rate at which and order in which these activities are carried out do not affect the spatial mapping between the image memory addresses and the spatial positions of display pixels.

A second general type of plural-bit-variable bit-map-organized image memory known to the prior art does not require a one-to-one correspondence between image memory address and the spatial positions of display pixels. There is a list of the values of the plural-bit pixel variables in a prescribed cyclic order, which cycles are arranged in the sequence of the tracing of the spatial positions of pixels in the display. The list is converted to a string of values of the pixel variables, with the bits in each value arranged in prescribed order according to relative significance. Each string of values is divided into words of given bit length, which words are stored respectively in successively addressed locations in the image memory. An image memory of this second general type has to be read out to a formatter with pixel unwrapping capability. The formatter reconstitutes the words into a string of values which are then parsed back into successive values of each pixel variable. The variables for each pixel are temporally aligned by the formatter to be available at the time the spatial position of that pixel is reached in the scanning of the display screen.

When a pixel is described in terms of plural variables—e.g., three primary color variables, or a luminance variable and two chrominance variables—it has been a general practice to group these variables in a prescribed order for each pixel and to use each group as subvariable components of a respective value of a complex pixel-descriptive variable. The values of this complex variable are then stored in a bit-map-organized image memory organized as either the first or the second type of image memory described above. This practice is reasonably satisfactory as long as the pixel-descriptive variables used as subvariable components of the complex variable are sampled at corresponding points in display space and with the same sampling density. However, it is desirable to be able to sample the pixel variables at differing sampling densities. This is primarily so that compressed video data can be more efficiently coded; bit image memory is also conserved and image processing involves less calculation. If the pixel variables have different sampling densities in image space, using complex pixel-descriptive variables becomes unattractive.

A type of dual-ported, dynamic random-access memory that has recently become commercially available is the so called "video random-access memory" or "VRAM". This dynamic memory, in addition to a random-access input/output port through which information can be written into or read out of the memory, has a serial-access port from which a row of data can be read serially at video scan rates. The row busses of a principal dynamic random-access memory portion of a VRAM are arranged to transfer data in parallel to a smaller auxiliary memory of the VRAM, during an interval equal to the read interval from the random-access port. A counter is provided in each VRAM for scanning the addresses of the auxiliary memory during its reading, so the auxiliary memory can function as a shift register. After parallel loading of the auxiliary memory, its contents are read out serially through the VRAM serial output port, with the counter counting at a relatively high clock rate. This clock rate can be the rate at which the luminance-only picture elements are delivered to the display monitor of the computer apparatus, for example. This speed of reading is possible because the capacitance-to-substrate of the auxiliary memory busses is relatively low owing to the smaller size of this auxiliary memory.

In some types of VRAM, data can also be serially read into the auxiliary memory via the serial-access port, to be transferred in parallel into the principal dynamic random-access portion of the VRAM. This allows faster writing of the VRAM than is possible by writing information via its random-access port.

D. L. Sprague, N. J. Fedele and L. D. Ryan in their U.S. patent application Ser. No. 4,740,832 entitled "IMAGE STORAGE USING SEPARATELY SCANNED LUMINANCE AND CHROMINANCE VARIABLES", filed Oct. 14, 1986, and assigned to RCA Corporation, point out that time interleaving of lines of digitized chrominance information with lines of digitized luminance information is usefully applied to the reading of VRAM through its serial access port. Such practice facilitates the use of separate bit-map organizations of the second general type for luminance and chrominance variables in VRAM. The use of separate bit-map organizations for luminance and chrominance variables, Sprague et al. perceived, avoids the problems encountered in the use of complex pixel-descriptive variables in a unified bit-map organization when chrominance is sampled less densely in display space than luminance is. Sprague et al. describe in detail how to linearly pack image memory into VRAM, when separate bit-map organizations for luminance and chrominance variables are used. The use of separate bit-map organizations can be accommodated by a display processor following the VRAM and responding to the image data supplied from the VRAM serial port, which display processor uses a rate-buffering memory for at least the chrominance samples, Sprague et al. realized. They used the rate-buffering memory for a further purpose to provide the sample bed information to support spatial interpolation in the direction transverse to line scan.

The literature indicates that 32 levels of luminance detail resolution in linearly coded video is all that is needed to support displays that the human viewer cannot distinguish from broadcast-quality television displays. The reader is directed to the paper by D. E. Troxel et al. entitled "A TWO-CHANNEL PICTURE CODING SYSTEM: I—REAL TIME IMPLEMENTATION", which appeared on pages 1841–1848 of *IEEE TRANSACTIONS ON COMMUNICATIONS*, Vol. COM-24, No. 12, December 1981. They indicate five bits per sample can linearly code luminance highs so pictures reconstructed from digitized samples are indistinguishable from broadcast-quality originals irrespective of viewing distance. If viewing distance is at least four times picture height, four bits can suffice.

Rather than coding a full-bandwidth luminance signals in eight-bits and two narrowband chrominance signals in substantially the same number of bits, in order to obtain a high-quality display, one may alternatively code a full-bandwidth luminance detail signal in four to five bits, a narrowband luminance signal in eight bits and the two narrowband chrominance signals in eight bits, the present inventors suggest. In such case, the VRAM will store luminance detail data in a bit-map organization that fully samples image space, and the VRAM will store narrowband luminance and chrominance data in at least one bit-map organization that subsamples image space. The Sprague et al. display processor will be modified to include rate-buffering memory and interpolator circuitry for narrowband luminance data as well as for narrowband chrominance data.

Suppose, for example, the display has 241 active scan lines of 253 pixels each and chrominance signals are subsampled 4:1 in the direction in which scan lines extend and in the direction transverse to scan lines. If the Sprague et al. scheme of coding images were followed with eight-bits alloted to luminance and to the two chrominance signals, there would be $241 \times 253 \times 8 = 487,784$ bits of luminance information per frame and $61 \times 63 \times 8 = 30,744$ bits of information per frame for each chrominance component. This is a total of 549,272 bits per frame when this form of the Sprague et al. coding scheme is employed. Suppose one follows the suggestion of the present inventors, coding narrowband luminance in eight-bits and luminance detail in five-bits. The number of bits of narrowband luminance is $61 \times 63 \times 8 = 30,744$ bits, just as for each chrominance component. The number of bits of luminance detail is $241 \times 253 \times 5 = 304,865$ bits.

This results in a total of 397,099 bits per frame, which is almost a one-quarter reduction in the number of bits per frame over the coding scheme used by Sprague et al. This surprisingly high reduction in number of bits per frame comes about because the narrowband luminance is narrowband not only in the direction in which scan lines extend, but also in the direction transverse to scan lines. This reduction in number of bits per frame can be viewed as being an increase in number of frames that can be described by a long bit stream.

A corresponding increase in number of frames that can be described by a long bit stream will be noted in the compressed video. This is the primary reason for seeking efficiency in the coding of image data stored in image memory. Usually all calculations in the drawing processor take place at a rate determined by the time needed to process the pixel variable with most bits of amplitude resolution. If calculations are made concerning a pixel variable with fewer bits amplitude resolution, it is customary to pad the variable with added ZEROs. This is the easiest procedure when image calculations are carried out separately and serially on component portions of the image data. When image calculations are carried out separately and parallelly on component portions of the image data, padding variables to equal bit length is still the easiest procedure, since the calculating hardware may be simply replicated and then operated synchronously. Efficient image coding can allow denser packing of image memory, but the formatter following image memory must have a more sophisticated pixel unwrapping capability if dissimilar bit lengths are used in the various pixel variables. Especially as the cost of computer memory per bit falls with progress in the art of making random-access memory, it may be preferred to pad the pixel variables stored in image memory to even bit-lengths, where their bit lengths differ by only one or two bits, in order to simplify timing and formatting problems.

One must take into account that the drawing processor updating VRAM contents responsive to compressed video has to perform a greater number of calculations to process four pixel variables than is required to process three pixel variables. However, the restrictions upon the transmission medium for compressed video are usually more severe system constraints than providing for a faster and somewhat more complex drawing processor. The four variable pixel descriptions advocated by the present inventors provide a better accommodation to the condition where the image changes cannot be completely accommodated by the compressed video medium. One can code the images in terms of the three narrowband variables and dispense with the wideband luminance variable for a time. A succession of images may lack detail, but can change fast enough that the displayed image is not segmented into different time frames. By way of illustration, continue the previously discussed example of image coding in accordance with the present inventors' precepts. The 30,744 bits of information per frame for each of the narrowband pixel variables sum to 92,232 bits per frame, somewhat less than one-quarter the number of bits per frame needed for the full-bandwidth image.

If one codes pixels in terms of a luminance detail variable and three narrowband color-componen variables as the present inventors suggest above, these three narrowband variables need not be a luminance variable and two color-difference variables. Indeed there are reasons they should not be.

Coding pixel information in terms of luminance and chrominance is inefficient in terms of providing optimal resolution in luminance for given pixel code lengths. Amplitude resolution is needed more in luminance components of the drive signals to the display device than in color-difference components of the drive signals insofar as keeping the human observer unaware of quantizing noise is concerned. When the display color is white or shades thereof, the chrominance variables are non-contributory to the display. The resolution in luminance is defined just by the number of available bit places in the luminance variable alone when pixel colors are defined in terms of luminance and chrominance variables.

In red (R), green (G) and blue (B) variables if red and blue have the same number of bits defining their ranges of variation as green does, the resolution in luminance amplitude is determined by the number of bit places in green, the most significant component of luminance, divided by the fraction of luminance that is green. This fraction is customarily about 0.59. Eight bits in luminance can define 256 levels therein; 7 bits, 128 levels. Eight bits in green can define 434 levels approximately in luminance; seven bits in green can define 217 levels approximately in luminance; six bits in green can define 108 levels approximately in luminance. This advantage in luminance resolution is not lost when the number of bit places in red and in blue is reduced relative to the number of bit places in green, towards the number of bit places in the primary color being in proportion to the logarithm-base-two of their respective contributions to luminance, as advocated by Cowlishaw. In fact, because the red and blue color variables introduce quantization levels into luminance that are intermediate to those introduced by the green color variable, there is somewhat better resolution in luminance. (Where the number of bits in red, green and blue are the same an improvement in luminance resolution can be obtained by staggering the quantizing levels in luminance respectively contributed by red, green and blue color variables, it is pointed out.)

One can compare the coding of luminance detail signal together with narrowband red, green and blue signals against the previously described coding of luminance detail signal together with narrowband luminance signal and two narrowband color difference signals. Assume narrowband red, green and blue are coded in six, seven and five-bits per pixel in accordance with Cowlishaw and that luminance detail is coded in five-bits per pixel in accordance with Troxel et al. Again, a display having 241 active scan lines of 253 pixels each for full bandwidth pixels is assumed. There are $241 \times 253 \times 5 = 304,865$ bits as before. There are $61 \times 63 \times 6 = 23,058$ bits per frame of narrowband red information, $61 \times 63 \times 7 = 26,901$ bits per frame of narrowband green information, and $61 \times 63 \times 5 = 19,215$ bits per frame of narrowband blue information. This is a total of 69,174 bits per frame of narrowband color component information, as compared to the 92,232 bits per frame of narrowband information for narrowband luminance and chrominance variables. This reduces the 397,099 bits per frame needed to code luminance and chrominance variables to $304,865 + 69,174 = 374,039$, coming closer to the one-quarter reduction in the number of bits per frame over the coding scheme used by Sprague et al. What is more important is that when the amount of frame-to-frame change in image overruns the capacity of the compressed video channel, the cutback to narrowband transmission can reduce the number of bits per frame over seven times.

SUMMARY OF THE INVENTION

The present invention is embodied in a principal one of its aspects in frame storage memory wherein luminance detail concerning the image is stored in a portion of memory the addressed storage locations of which fully sample image space and wherein three narrowband color components of the image are stored in another portion of the image memory the addressed storage locations of which subsample image space.

BRIEF DESCRIPTION OF THE DRAWING

FIGS. 11–16 are diagrams of how VRAM rows can be packed with image data in accordance with the invention.

DETAILED DESCRIPTION OF THE PREFERRED EMBODIMENT

Figure 1:
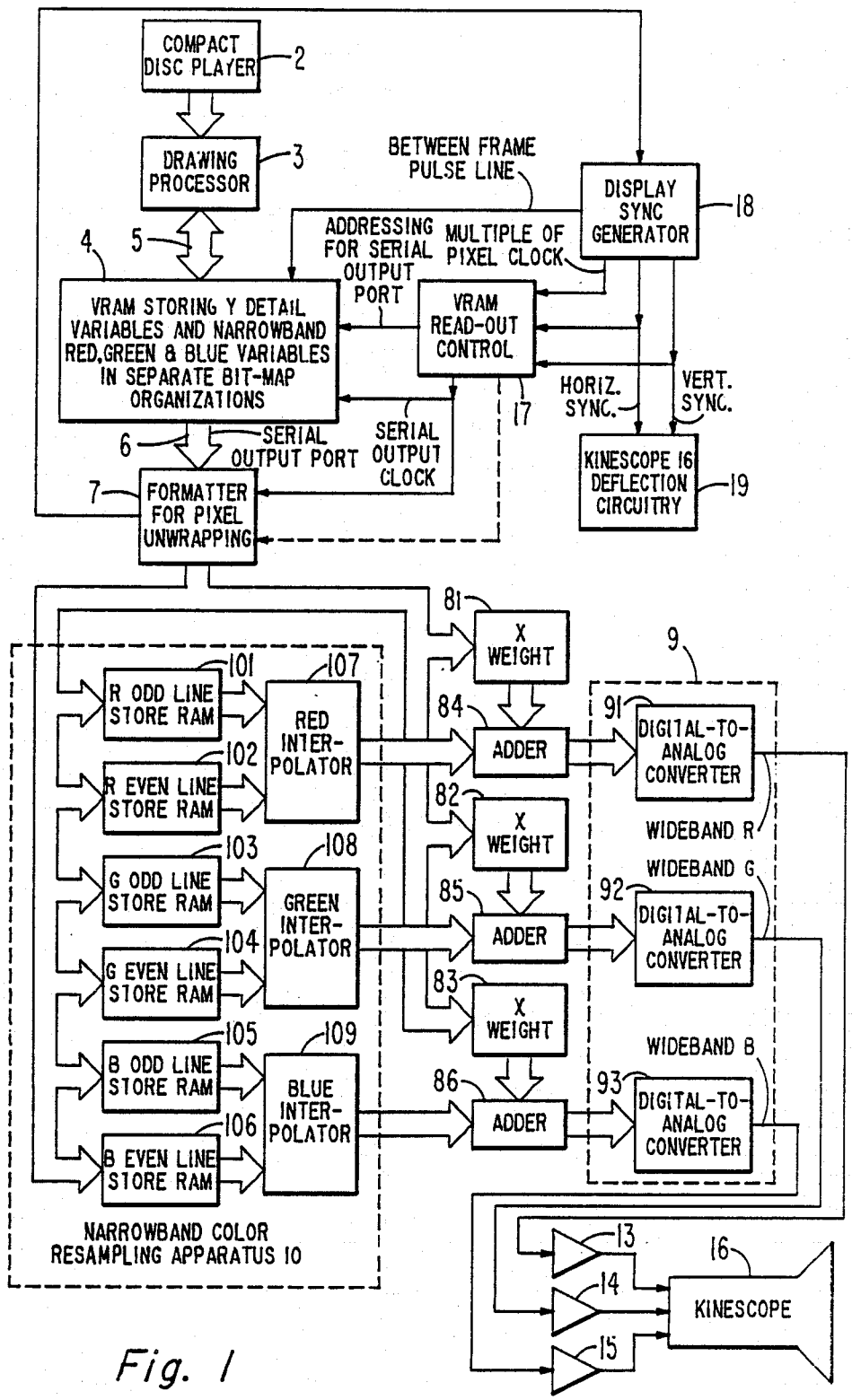
FIG. 1 is a schematic diagram of a television display system which includes narrowband color resampling apparatus and embodies the invention.

FIG. 1 shows a television display system which converts television imagery, stored in compressed form on a compact disc, to a real-time display. A compact disc player 2 supplies the television imagery in coded form to a drawing processor 3. (Another data source, such as a Winchester disc, may be used instead of compact disc player 2.) The imagery coding is designed to describe differences of a current image from recent images already reconstructed and stored in the image memory portions of a video random-access memory (or VRAM) 4, to lessen redundancy in the imagery coding. (VRAM 4, as will be explained in detail further on, is in actuality a banked array of component monolithic VRAMs.) Drawing processor 3 has a bus connection to the read-/write random-access port of VRAM 4 and to VRAM 4 control circuitry that allows drawing processor 3 to read out to itself any of the images stored in VRAM 4 and that allows drawing processor 3 to write a current or updated image into the image memory portion of VRAM 4. VRAM 4, in addition to its random-access input/output port, has a serial output port from which a row of data can be read serially at video rates.

The nature of the stored images in VRAM 4 is of particular concern to the invention. The image memory portions of VRAM 4 are separately bit-map-organized with respect to luminance detail samples and with respect to narrowband red, green and blue samples.

The densely-sampled-in-space bit-map organization for luminance detail samples is stored in one portion of image memory; and a separate sparsely-sampled-in-space bit-map organization for (red, green and blue) samples is stored in another portion of image memory. It is convenient to make the sparser spatial sampling a subsampling of the denser spatial sampling. Where the ratio of the spatial sampling densities varies, the apportionment of image memory between luminance detail samples and the component color samples changes.

During line trace intervals in the display, lines of luminance detail samples from the more densely sampled bit-map-organized portions of image memory that have been loaded in parallel into the VRAM 4 auxiliary memory are read out serially through the serial output port 6 of VRAM 4 to a formatter 7. Formatter 7 performs "pixel-unwrapping" functions to furnish pixel data concerning either luminance detail or one of the color components. Formatter 7 is of relatively simple construction if the pixel variables are constrained to being expressed within the bit lengths that are an integral power of two. For the sake of simplicity of explanation, this will be assumed to be the case, with pixel variables of lengths different from this being padded with ZEROs. The way formatter 7 operates will be described in more detail further on. During line trace intervals formatter 7 re-times the luminance detail samples (supposing them to have been "linearly packed" in VRAM 4, as will be described in greater detail further on) so they are supplied at pixel scan rate to weighting multipliers 81, 82 and 83 to be weighted in accordance with the contributions of red, green and blue to luminance. The weighted luminance detail samples from multipliers 81, 82 and 83 are supplied as addends to adders 84, 85 and 86 respectively, the sum outputs of which are each converted to analog form in digital-to-analog conversion circuitry 9. Circuitry 9 is shown as comprising three digital-to-analog converters 91, 92 and 93 receptive of the sum outputs of adders 84, 85 and 86 respectively. The analog output signal of converter 91 (which is a wideband red signal), the analog output of converter 92 (which is a wideband green signal), and the analog output of converter 93 (which is a wideband blue signal) each have suitably weighted high-spatial-frequency luminance detail content.

During selected line retrace intervals in the display, lines of samples of red, green and blue variables from the less densely sampled bit-map-organized portions of image memory are selected for read out from VRAM 4 via serial access output port 6 to formatter 7. One way to do this is to read out during each selected line retrace interval, a line of samples of one primary color followed by a line of samples of another primary color followed by a line of samples of the remaining primary color. This permits separate bit-map organizations for red samples, green samples and blue samples, which simplifies the drawing processor 3 required for converting coded imagery from compact disc player 3 to bit-map organization image data in VRAM 4. Simplification arises because calculations involving red samples, green samples and blue samples respectively can be performed separately and serially, such calculations being made with simpler interfacing between drawing processor 3 and VRAM 4. The time-division-multiplexing of red, green and blue output signals from formatter 7 to a narrowband color resampling apparatus 10 during display processing is also simplified, since the multiplexing rate during line retrace intervals is low.

Another way of operating allows a lower rate of reading from VRAM 4 during line retrace intervals. Lines of red samples are read out during respective ones of a first set of line retrace intervals. Lines of blue samples are read out during respective ones of a second set of line retrace intervals. Lines of green samples are read out during respective ones of a third set of line retrace intervals. The first, second and third sets of line retrace intervals are interleaved in time. To permit this mode of operation the red, blue and green samples are offset in image spatial, so they occur in different spatial phasings.

Formatter 7 performs further pixel-unwrapping functions, in separating successive red, green and blue samples in the supplying of separate bit streams of red samples, of green samples and of blue samples to the narrowband color resampling apparatus 10. If VRAM image memory is read out in one of the ways described above respective bit streams of red, green and blue samples are supplied serially in a prescribed order to narrowband color resampling apparatus 10. The narrowband color re-sampling apparatus 10 re-samples the digitized red, green and blue variables to the same sampling density as the digitized luminance, or Y, detail. The fully sampled narrowband red signal is supplied as an addend to adder 84 to be added with weighted luminance detail from multiplier 81 to generate a wideband red signal at the sum output of adder 84. The fully sampled narrowband green signal is supplied as an addend to adder 85 to be added with weighted luminance detail from multiplier 82 to generate a wideband green signal at the sum output of adder 85. The fully sampled narrowband blue signal is supplied as an addend to adder 86 to be added with weighted luminance detail from multiplier 83 to generate a wideband blue signal at the sum output of adder 86. The narrowband color resampling apparatus 10 includes time delay apparatus. The delay apparatus brings the red, green and blue samples supplied as addends to adders 84, 85 and 86 into proper alignment-in-time with the luminance detail samples also supplied to adders 84, 85 and 86 as addends. This allows the narrowband color signals to be matrixed together with properly timed luminance detail signals to generate the wideband color signals at the sum outputs of adders 84, 85 and 86. These wideband color signals are converted to analog form by circuitry 9 red (R) and green (G) and blue (B) drive signals. These R, G and B drive signals are amplified by video amplifiers 13, 14 and 15 respectively. The amplified drive signals are then applied to kinescope 16 to generate the color display.

Still referring to FIG. 1, a display synchronizing generator 18 generates HORIZONTAL SYNCHRONIZATION and VERTICAL SYNCHRONIZATION pulses for application to the deflection circuitry 19 of kinescope 16. Display synchronizing generator 18 also supplies signals to VRAM read-out control circuitry 17 to inform it concerning display timing. For example, VRAM read-out control circuitry 17 includes a line counter for counting HORIZONTAL SYNCHRONIZATION pulses supplied from display synchronizing generator 18. This line counter is reset to zero by a BETWEEN FRAME pulse supplied by display synchronizing generator 18 after the conclusion of each frame of display and before the start of the next. Display sync generator 18 also supplies pulses at a multiple of the pixel scan rate to control circuitry 17. Circuitry 17 scales from these pulses to generate an appropriate SERIAL OUTPUT CLOCK signal for application to VRAM 4 and to formatter 7.

The formatter 7 allows data to be taken out "full width" from the serial output port 6 of VRAM 4, so the clock rate at which data is clocked from port 6 can be kept to a minimum. For example, if port 6 is thirty-two bits wide, then during the line trace interval, each 32-bit word read out through port 6 can be apportioned into four successive eight-bit luminance detail samples by formatter 7, permitting the VRAM output to be scanned at one-fourth the pixel sca rate. Formatter 7 does this formatting responsive to instructions from control circuitry 17. Control circuitry 17 also selects the rows in VRAM 4 to be transferred in parallel to the VRAM 4 shift register that thereafter shifts its contents out through serial-access output port 6. VRAM read-out control circuitry 17 also applies the correct SERIAL OUTPUT CLOCK signal to this shift register for this shifting procedure.

Continuing the example, suppose the red, green, blue and luminance detail signals are each made to have eight-bits per sample, if necessary, through padding. Suppose further the red, green and blue signals are spatially subsampled every fourth luminance detail sample in every fourth line of luminance detail samples. During a selected line retrace interval the number of samples in each of the red, green and blue signals is one-quarter the number of samples of the luminance detail signal during a line trace. So, altogether the total number of bits per scan line in the narrowband color samples is three-quarters the number of bits per scan line in the luminance detail samples. Since the total number of samples of narrowband color per one of its scan lines is to be transferred from VRAM 4 serial output port 6 in a line retrace interval one fifth the duration of the line trace interval in which luminance detail samples are displayed, VRAM read out control circuitry 17 has to increase the SERIAL OUTPUT CLOCK rate during line retrace by a factor of at least $3\frac{3}{4}$ times. This supposes that the number of bits per sample taken from VRAM 4 is the same during line retrace intervals as during line trace intervals.

If clock rates are scaled only by powers of two from a high rate master clock signal, the serial clock rate used to read from VRAM 4 during line retrace interval will be four times the pixel scan rate for luminance detail. Alternatively, a thirty-two-bit-wide serial output can be taken from VRAM 4 without increasing clock rate. Either alternative reduces the time needed for accessing VRAM 4 for obtaining narrowband color samples to somewhat less than a complete line retrace interval.

The narrowband color resampling apparatus 10 includes line-storage random-access memories 101, 102, 103, 104, 105 and 106. A selected triple of these line-storage memories 101–106 are written responsive to narrowband red samples , narrowband green samples and narrowband blue samples supplied to them respectively from formatter 7 during selected line retrace intervals. Line-storage memories 101 and 102 are written alternately by successively selected lines of narrowband red samples, and memories 101 and 102 are read out repeatedly during line trace intervals to supply adjacent lines of narrowband red samples in parallel to a two-dimensional spatial interpolator 107. Line-storage memories 103 and 104 are written alternately by successively selected lines of narrowband green samples. Memories 103 and 104 are read out repeatedly during line trace intervals to supply adjacent lines of green samples in parallel to a two-dimensional spatial interpolator 108. Line storage memories 105 and 106 are written alternately by selected lines of narrowband blue samples. Memories 105 and 106 are read out repeatedly during line traces intervals to supply adjacent lines of narrowband blue samples to a two-dimensional spatial interpolator 109. Interpolators 107, 108 and 109 supply resampled narrowband red signals, narrowband green, and narrowband blue to the adders 84, 85 and 86 respectively. Each of these narrowband component color signals is resampled to the same spatial sampling density as luminance detail.

The output samples supplied from formatter 7 during line retrace intervals may also be weighted by weighting multipliers 81–83, the weighted samples may be supplied to adders 84–86, and the adder sum outputs may be converted to analog signals by conversion circuitry 9. However, line retrace blanking customarily employed in video amplifiers 13–15 prevents these analog signals from causing any display response on kinescope 16.

Figure 2:
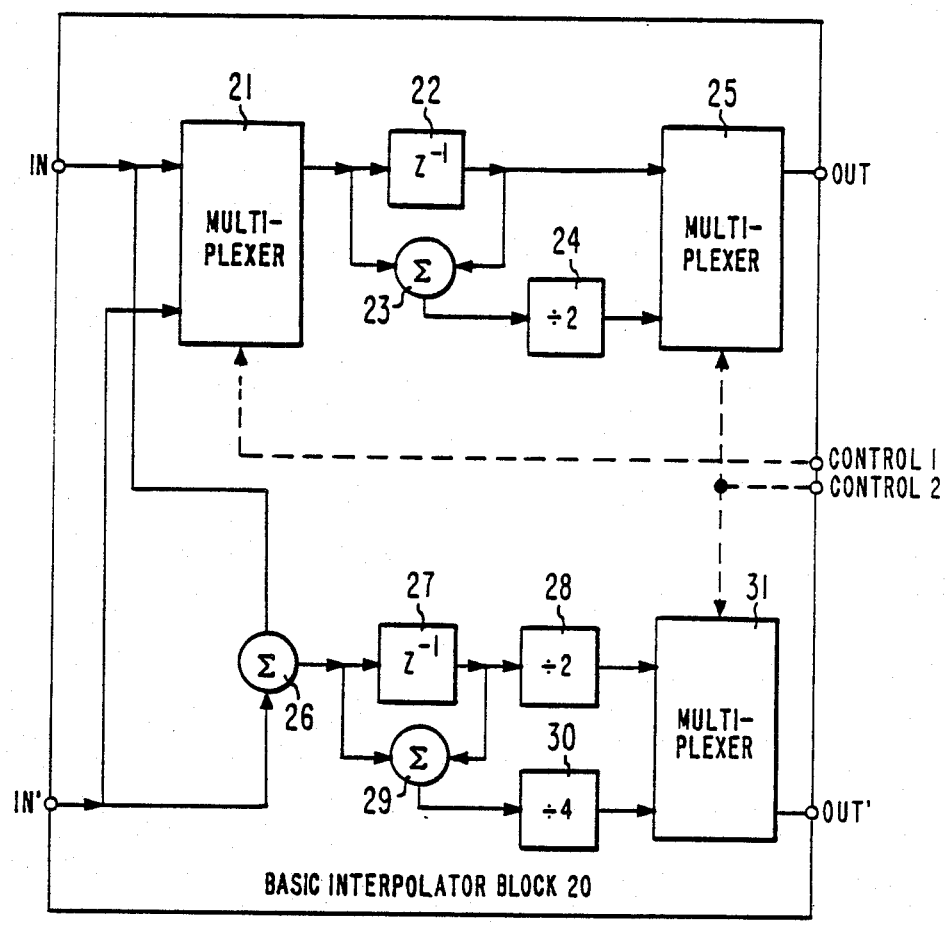
FIG. 2 is a schematic diagram of a basic interpolator block, used as a building block in interpolators that may be used in implementing the FIG. 1 television display system.

FIG. 2 shows a novel basic interpolator block 20 that can be used as a basis for the construction of each of the interpolators 107, 108 and 109, to provide for each of them being bilinear interpolators. The output pixel scan rate from the block 20 is double the input pixel scan rate to its input terminals IN and IN'. Respective streams of pixel samples from adjacent scan lines in subsampled image space are repetitively supplied at output scan line rate to terminals IN and IN' of interpolator block 20. Each scan line in subsampled image space is repeated either $2^{(n+1)}$ times, or one less time, where $2^n$:1 spatial interpolation is performed in the direction transverse to scan lines, n being a positive integer at least unity. Repeating the scan lines $2^{(n+1)}$ times simplifies the clocking of the line store RAMs 101–106. In either case, the line store RAMs 101–106 can be loaded during two successive line retrace intervals, rather than just one.

A multiplexer 21 responds to a CONTROL 1 signal to select the one of the streams of pixels applied to terminal IN and IN' for spatial interpolation that is earlier-in-time in the direction of line scanning. As a first step in this interpolation the selected stream of pixels is applied to a one-pixel-delay circuit 22. The pixels from the selected stream are summed in an adder 23 with the pixels from the selected stream as delayed one pixel by circuit 22, and the resultant sum is divided by two in a bit-place shifter 24 to supply the average of two successive pixels in the stream selected by multiplexer 21. A multiplexer 25 alternately selects to the terminal OUT of interpolator block 20 the delayed pixel output of circuit 22 and that average of two successive pixels. This selection by multiplexer 25 is made at the pixel output rate that is twice the pixel input rate.

Terminal OUT' of interpolator block 20 supplies another stream of pixels at this pixel output rate, representative of an interpolated scan line preceding the scan line supplied through terminal OUT. This interpolated scan line is generated as follows. The streams of pixels supplied to terminals IN and IN' of interpolator block 20 are summed in an adder 26 and applied to a one-pixel-delay circuit 27. The output of circuit 27 is divided by two by a one-bit-place shifter 28 to supply pixels for the interpolated scan line which are interpolated only in the direction transverse to the scan line direction. Pixels for the interpolated scan line which are also interpolated in the direction of the scan line are generated by (1) summing in an adder 29, the adder 26 output and the adder 26 output as delayed one pixel in circuit 27 and (2) dividing the resultant sum from adder 29 by four in a two-bit-place shifter 30. A multiplexer 31 alternately selects to terminal OUT' of interpolator block 20 the pixels for the interpolated line scan that are not interpolated in the direction of line scan and those pixels that are. This selection by multiplexer 31 is made at the pixel output rate, which is twice the pixel input rate.

Interpolator block 20 resamples its input data as supplied to terminals IN and IN' to provide at its terminals OUT and OUT' samples at 4:1 higher scan rate. However, these samples are not in regular scan line order.

Figure 3:
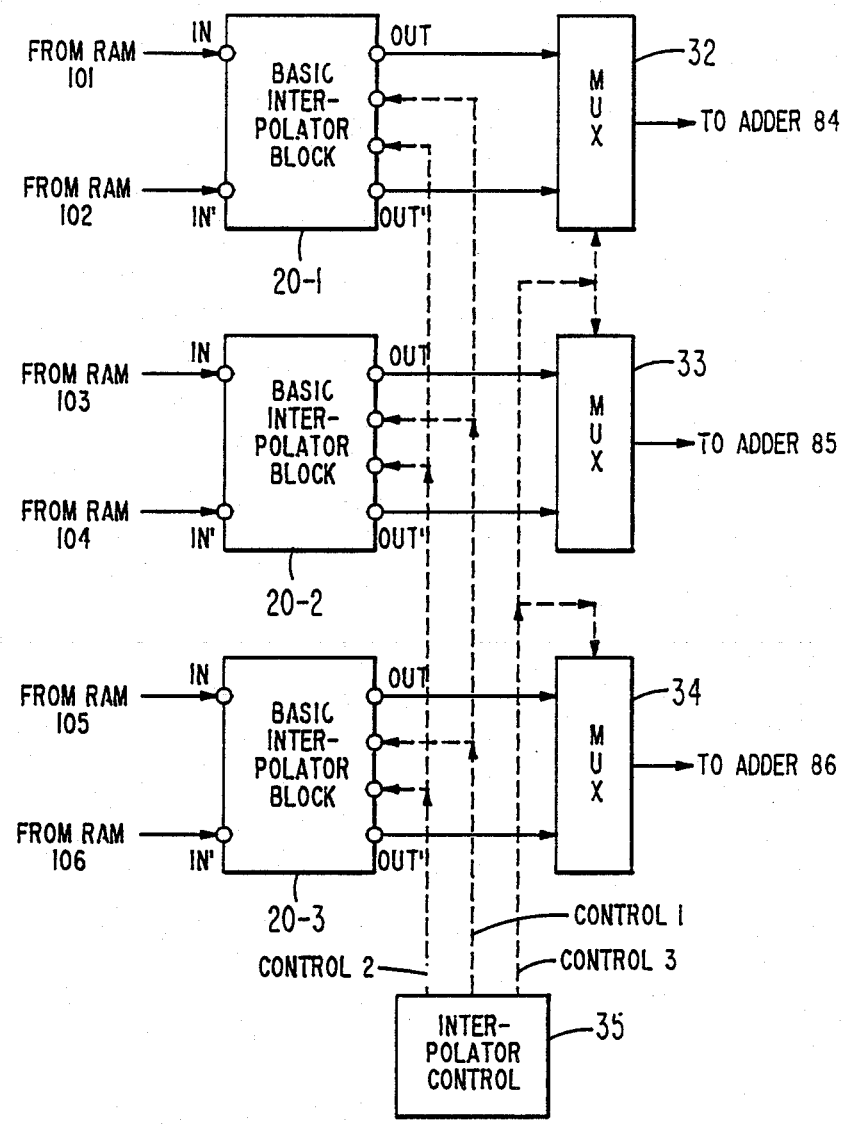
FIGS. 3 and 4 are schematic diagrams of two interpolators, each constructed using one or more FIG. 2 basic interpolator blocks, and each applicable for use in the FIG. 1 television display system.

FIG. 3 shows how interpolators 107, 108 and 109 of FIG. 1 can be constructed using three basic interpolator blocks 20-1, 20-2 and 20-3 together with multiplexers 32, 33 and 34, when 2:1 spatial interpolation is desired both in the direction of scan line extension and in the direction transverse to the scan lines. Multiplexers 32, 33 and 34 operate to place the higher scan rate red, green and blue samples in regular scan line order. Line storage RAMs 101, 102, 103, 104, 105 and 106 are each read four (or three) times before being re-written. When interpolators 107, 108 and 109 are constructed per FIG. 3, RAMs 101, 103 and 105 are written simultaneously, and RAMs 102, 104 and 106 are written simultaneously. There is a two-scan-line offset between the writing of RAMs 101, 103 and 105 and the writing of RAMs 102, 104 and 106, when the interpolators 107, 108 and 109 are constructed per FIG. 3.

Interpolation control circuitry 35 supplies CONTROL 1 signal at the input line advance rate to each the basic interpolator blocks 20-1, 20-2 and 20-3. Circuitry 35 also supplies them both with the CONTROL 2 signal at twice the input scan rate (which in the FIG. 3 interpolators equals the output pixel scan rate). Circuitry 35 further supplies a CONTROL 3 signal switching at input line advance rate to each of the multiplexers 32, 33 and 34. Multiplexers 32, 33 and 34 provide input data for adders 81, 82 and 83 by selecting the three interpolated signals from the terminals OUT' of blocks 20-1, 20-2 and 20-3 respectively during one set of alternate output lines. During the intervening set of alternate output lines, multiplexers 32, 33 and 34 provide input data for adders 81, 82 and 83 by selecting the three interpolated scan lines from the terminals OUT of blocks 20-1, 20-2 and 20-3 respectively. Multiplexer 32 arranges the output scan lines of narrowband red samples in correct sequential order, compensating for the reversals of scanning line order in line-storage RAMs 101 and 102 accepted in order to reduce the frequency of their re-writing. In like manner multiplexer 33 arranges the output scan lines of narrowband green samples in correct sequential order, compensating for the reversals of scanning line order in line-storage RAMs 103 and 104. Multiplexer 34 arranges the output scan lines of narrowband blue samples in correct sequential order, compensating for the reversals of scanning line order in line storage RAMs 105 and 106. Cascade connections of pluralities n in number of basic interpolator blocks replacing the single basic interpolator blocks 20-1, 20-2 and 20-3 can be used to implement $2^n:1$ spatial interpolation both in the direction of scan line extension and in the direction transverse to scan lines.

Figure 4:
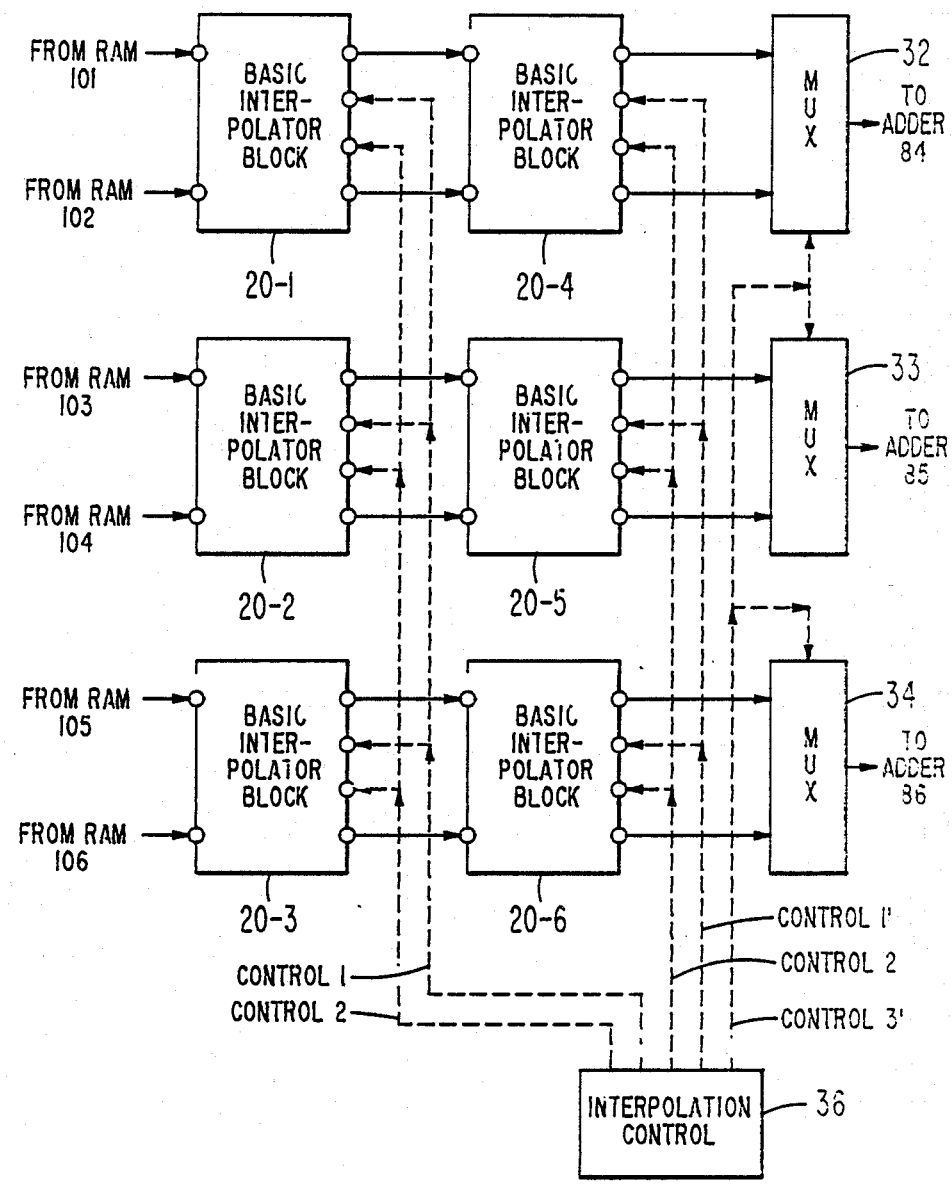

FIG. 4 shows how interpolators 107, 108 and 109 can be constructed to provide 4:1 spatial interpolation in each of these directions. Basic interpolator block 20-1 is followed in cascade connection by another basic interpolator block 20-4 and multiplexer 32 in this embodiment of interpolator 107. Basic interpolator block 20-2 is followed in cascade connection by another basic interpolator block 20-5 and multiplexer 33 in this embodiment of interpolator 108. Basic interpolator block 20-3 is followed in cascade connection by another basic interpolator block 20-6 and multiplexer 34 in this embodiment of interpolator 109. Line storage RAMs 101-106 are each read eight (or seven) times before being re-written when interpolators 107, 108 and 109 are constructed per FIG. 4. RAMs 101, 103 and 105 are written simultaneously, and RAMs 102, 104 and 106 are written simultaneously. There is a four-scan-line offset between the writing of RAMs 101, 103 and 105 and the writing of RAMs 102, 104 and 106, when the interpolators 105 and 106 are constructed per FIG. 4.

Interpolation control circuitry 36 supplies the CONTROL 1 signal to each of the blocks 20-1, 20-2 and 20-3 at one half their output line advance rate. Interpolation control circuitry 36 also supplies the CONTROL 2 signal at twice the pixel scan rate from line-storage RAMs 101-106 to each of the blocks 20-1, 20-2 and 20-3. In the FIG. 4 interpolators this rate equals one-half the output pixel scan rate. Interpolation control circuitry 36 also supplies the CONTROL 3 signal switching at the input line advance rate to multiplexers 32, 33 and 34. As in the FIG. 3 interpolation circuitry, multiplexers 32, 33 and 34 compensate for line scanning order reversals in line-storage RAMs 101-106.

Basic interpolator blocks 20-1, 20-2 and 20-3 supply, to basic interpolator blocks 20-4, 20-5 and 20-6 in cascade after them, twice as many input scan lines as they received from the line storage RAMs 101-106. Accordingly, interpolation control circuitry 36 supplies a CONTROL 1' signal to the CONTROL 1 signal connections of basic interpolator blocks 20-4, 20-5 and 20-6 at one half their output line advance rate—that is, at the output line advance rate of basic interpolator blocks 20-1, 20-2 and 20-3.

Basic interpolator blocks 20-4, 20-5 and 20-6 receive pixels from basic interpolator blocks 20-1, 20-2 and 20-3 at twice the pixel scan rate from line-storage RAMs 101-106. Interpolation control circuitry 36 supplies a CONTROL 2' signal to the CONTROL 1 signal connections of basic interpolator blocks 20-4, 20-5 and 20-6 at the twice their pixel input rate, which is four times the pixel output rate from line-storage RAMs 101-106.

Figure 5:
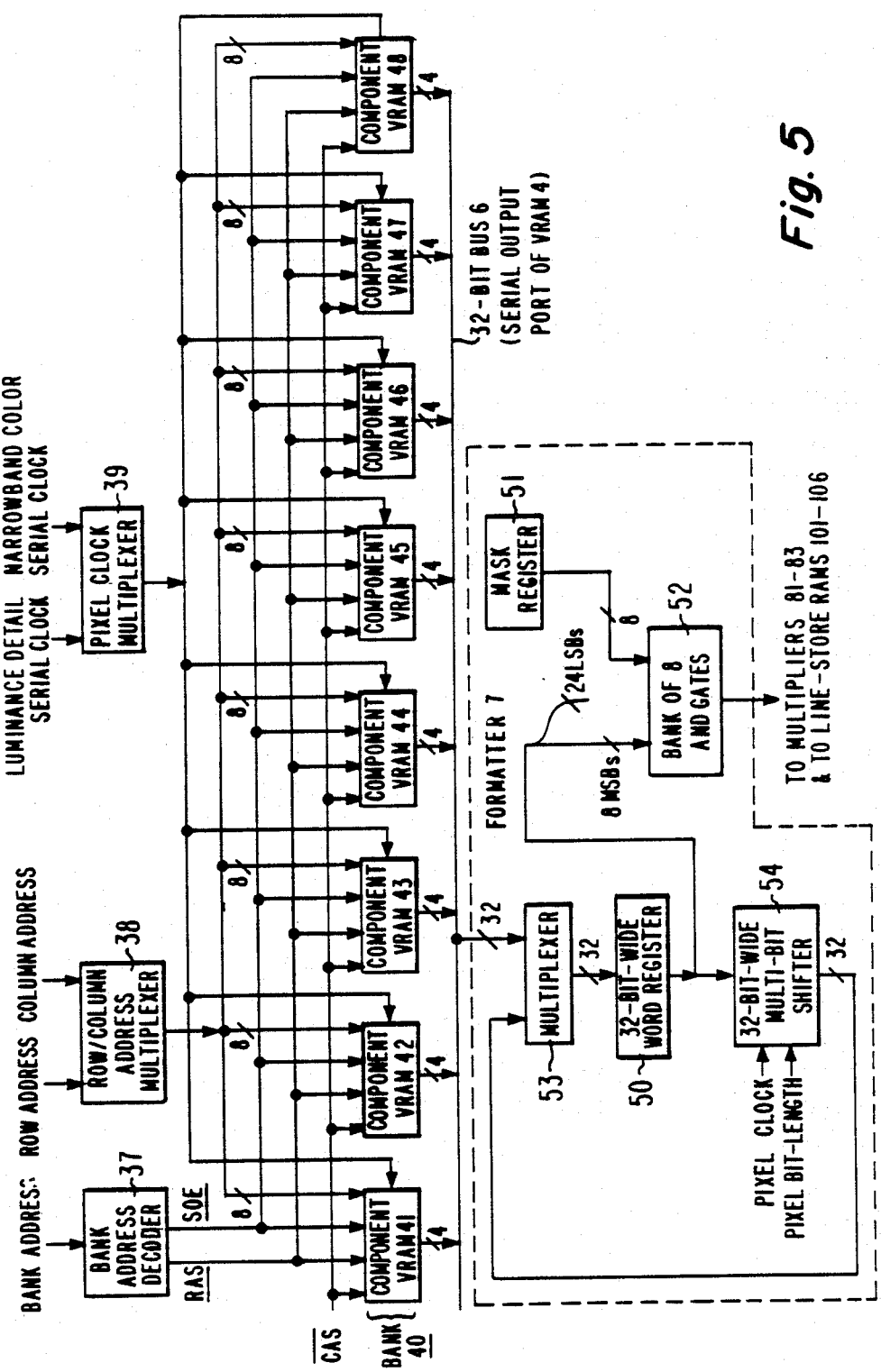
FIG. 5 is a schematic diagram of video random-access memory architecture used in the FIG. 1 television display system.

FIG. 5 shows more particularly the construction of one bank of VRAM 4, a thirty-two-bit-wide data bus 6 connecting VRAM 4 serial output port to formatter 7, and formatter 7 which performs the pixel-unwrapping function. VRAM 4 comprises at least one bank 40 of eight component VRAMs. FIG. 5 is offered as an aid to understanding more completely how the luminance-detail information and narrowband color data can be stored in separate bit-map organizations.

In preferred embodiments of the invention, the bit-maps are stored in VRAM 4 as if the following mapping procedure were followed. Each of the several-bit-pixel data is converted from parallel-bit to serial-bit format according to a prescribed ordering rule. The successive pixel data in each scan line are then strung together seriatim. The resulting strings of bits descriptive of a display scan line are then strung together in the order of display scan line advance, so the description of a complete image field is afforded by the resulting still longer string of bits. This string of bits is then mapped into successive rows of VRAM 4 in a procedure called "linear packing". Linear packing permits the density of storage in VRAM 4 to be as high as possible despite the bit-length of the pixel codes being chosen from a plurality of code lengths submultiple to the number of bits in a row of a VRAM 4 bank, such as bank 40. A commercially available component 64K×4 VRAM contains four square dynamic memory arrays $2^8$ bits on a side, it also contains static memory operable to provide four parallel-in/serial-out registers as buffer memory to a four-bit wide serial output port. A bank of eight such component VRAMs provides 256 rows of 256 four-byte digital words, and these dimensions will be assumed by way of example for VRAM 4 throughout the remainder of this specification.

The loading of the static memories in the component VRAMs, which serve as buffer memories to the serial output port of VRAM 4, is controlled by a SERIAL READ-OUT ADDRESS CODE called SRAC for short. SRAC is a three part code consisting of a first group of adjacent bit places containing a BANK ADDRESS, a second group of adjacent bit places containing a ROW ADDRESS and a third group of adjacent bit places containing COLUMN ADDRESSES. The ROW ADDRESS and COLUMN ADDRESS portions of SRAC are descriptive of storage location placement in VRAM 4 and are not directly related to the dimensions of the display raster, the bit-map organization for luminance detail pixel codes or the bit-map organization(s) for narrowband color pixel codes. SRAC will be assumed to code BANK ADDRESS in its most significant places, which is preferable to do from the viewpoint of allowing easy add-on of more banks of component VRAMs. SRAC will be assumed to code COLUMN ADDRESS in the least significant group of eight bit places and to code ROW ADDRESS in the next least significant group of eight bit places. Each of the $2^m$ values of BANK ADDRESS is assigned solely to a respective bank of VRAM 4, and a bank address decoder 37 for that bank 40 of VRAM 4 to which the current value of those m bits is assigned responds to that value to condition bank 40 of VRAM 4 for reading out to the thirty-two bit wide data bus 6. This arrangement makes possible the multiplexed connection of the banks 40, etc. of VRAM 4 to bus 6.

The ROW ADDRESS portion of SRAC governs the choice of row to be loaded for the serial-access output port of at least the selected bank 40 of VRAM 4. Bank 40 (like the other banks of VRAM 4) comprises a respective octet of component VRAMs 41, 42, 43, 44, 45, 46, 47, 48 each having a four-bit-wide serial-access port. The number of bits in a row of VRAM 4 serial output is 256 columns times 32 bits per column, for a total of $2^{13}$ bits.

The COLUMN ADDRESS portion of SRAC specifies an offset in the counter-generated addresses for the static memories in component VRAMs 41-48 etc, during their reading. The static memories in each component VRAM are written in parallel from the associated dynamic memory in that component VRAM with zero-valued offset. The serial reading of the static memories through the serial output ports of the component VRAMs in the selected bank 40 of VRAM 4 begins at the column location specified by the COLUMN ADDRESS portion of SRAC. Where a plurality of display lines of information are stored in a VRAM 4 row, the COLUMN ADDRESS portion of SRAC permits the serial output from VRAM 4 to commence at the beginning of any one of the display lines of information.

Except when the number of bits in a display line equals or exceeds the number of bits per row in VRAM 4, the row of VRAM 4 transferred to the static memories in the component VRAMs 41-48 of the selected bank 40 generally will not be fully read out before those static memoies are re-written. The underlying reason for this is that luminance detail pixel codes are read from VRAM 4 during line trace intervals through the same serial output port that narrowband color pixel codes are read from VRAM 4 during line retrace intervals. This time-division-multiplexing between bit-map organizations requires that the static memories be re-written each time data from a different one of the bit-map organizations is to be read out.

Any particular bank of VRAM 4 can be selected responsive to the BANK ADDRESS portion of SRAC, which has m bits, where $2^m$ is the number of banks of component VRAMs in VRAM 4. Each bank of VRAM 4 has a respective bank select decoder for decoding the BANK ADDRESS portion of SRAC, analogous to bank select decoder 37 for bank 40 of VRAM 4. All component VRAMs in VRAM 4 have respective $\overline{TR/OE}$ pins (not shown). All these $\overline{TR/OE}$ pins receive in parallel a LOW logic condition as a TRANSFER signal at times of transfer of a row of data in any one of VRAM 4 banks to the static memory therein from which serial output port is supplied data. The $\overline{TR/OE}$ pins for a selected bank also receive a LOW logic condition as an OUTPUT ENABLE signal when the random-access output/input port is accessed in an aspect of operation not connected with the present invention. The TRANSFER signal is executed as a command only when a ROW ADDRESS STROBE signal is applied to a $\overline{RAS}$ pin of each component VRAM involved. Bank address decoder 37 applies a high-to-low transition only to the $\overline{RAS}$ pins of the selected bank 40 of component VRAMs 41-48 when a row of data is to be transferred into the auxiliary-static-memory portions of component VRAMs 41-48.

A row/column address multiplexer 38 applies ROW ADDRESS to the eight ADDRESS pins of the component VRAMs 41-48 to indicate which row of data is being transferred for serial output. $\overline{RAS}$ is then allowed to go high, and column address multiplexer 38 applies COLUMN ADDRESS to the eight ADDRESS pins of component VRAMs 41-48. A COLUMN ADDRESS STROBE is applied to the $\overline{CAS}$ pins of VRAMs 41-48; this signal going low loads the internal address counters of VRAMs 41-48 with appropriate offsets for serial read out. $\overline{CAS}$ is then allowed to go high.

A pixel clock multiplexer 39 selects between the LUMINANCE DETAIL SERIAL OUTPUT CLOCK and NARROWBAND COLOR SERIAL OUTPUT CLOCK signals for application to the serial clock or SC pins of the component VRAMs. Bank address decoder 37 applies a low condition to the $\overline{SOE}$ pins of only the selected bank 40 of component VRAMs as a SERIAL OUTPUT ENABLE signal during the serial output from VRAM 4. This conditions the serial output ports of component VRAMs 41-48 to be multiplexed to the 32-bit-wide bus 6. The LUMINANCE DETAIL SERIAL OUTPUT CLOCK and NARROWBAND COLOR SERIAL OUTPUT CLOCK are both generated by a respective programmable division from a MASTER CLOCK signal.

Details of the construction of the formatter 7 for parsing the successive 32-bit words from the serial output bus 6 into pixels are shown in FIG. 5. A 32-bit word register 50 holds thirty-two successive bits, a number n of the most significant of these bits being the code descriptive of luminance detail or color. For convenience n is constrained to be an integral power of two, eight or less. A programmable mask register 51 holds a group of n ONEs in the most significant of its eight bit places and a group of (8−n) ZEROs in the least significant bit places. The contents of mask register 51 and the eight most significant bits of the word contained in register 50 have their corresponding bit places ANDed in a bank 52 of AND gates to furnish selected signal pixels of luminance detail or color data. Where these data are shorter than eight bits, the bit places of lesser significance are filled with ZEROs.

When the first thirty-two bit word in a row of VRAM 4 is supplied to formatter 7 via serial output port bus 6, a multiplexer 53 admits that word to the 32-bit word register 50. The n most significant bits of that word defining a pixel datum are input data for the multipliers 81-83 during the interval when a luminance detail bit-map in VRAM 4 is scanned, and are input data for narrowband color resampling apparatus 10 during the interval when a color bit-map in VRAM 4 is being scanned.

When the next (32−n)/n pixel data are being provided to multipliers 81-83 or to narrowband color resampling apparatus 10, multiplexer 53 successively admits the (32−n)/n successive output of a 32-bit multi-bit shifter 54 to word register 50. Shifter 54 shifts n bits toward increased significance with each successive pixel as timed by PIXEL CLOCK pulses.

As the modulo-n first pixel datum is to be provided to digital-to-analog converter 8 or to narrowband color resampling apparatus 10, multiplexer 53 admits a new 32-bit word into register 50 instead of shifting the old word. Multiplexer 53 can be controlled by decoding one output of a modulo-n pixel counter, for example. This counter can consist of the last n stages of a modulo-32 counter counting at pixel clock rate, which counter together with a binary shifter comprises multi-bit shifter 54.

One skilled in the art and provided with the foregoing description of the interface between VRAM 4 and formatter 7 will readily discern possible variants in the VRAM 4 digital word organization and changes in the formatter 7 architecture to accommodate these variants. With each thirty-two-bit word read from VRAM 4, the pixel order may be opposite to that described, for example, in which case formatter 7 structure is altered as follows. The programmable mask register 51 holds a group of n ONEs in its least significant (rather than most significant) bit places. The group of (8−n) held in ZEROs are the most significant bit places of mask register 51. The bank 52 of sixteen AND gates receives input from the eight least significant (rather than most significant) bit places of word register 50, as well as receiving input from mask register 51 with its modified mask contents. The multi-bit shifter 54 shifts n bits towards decreased significance (rather than increased significance) with each successive pixel as timed by PIXEL CLOCK pulses. Another variation readily conceived of is that the column or word read addresses in VRAM 4 may either increment or decrement as the display is horizontally scanned.

Figure 6:
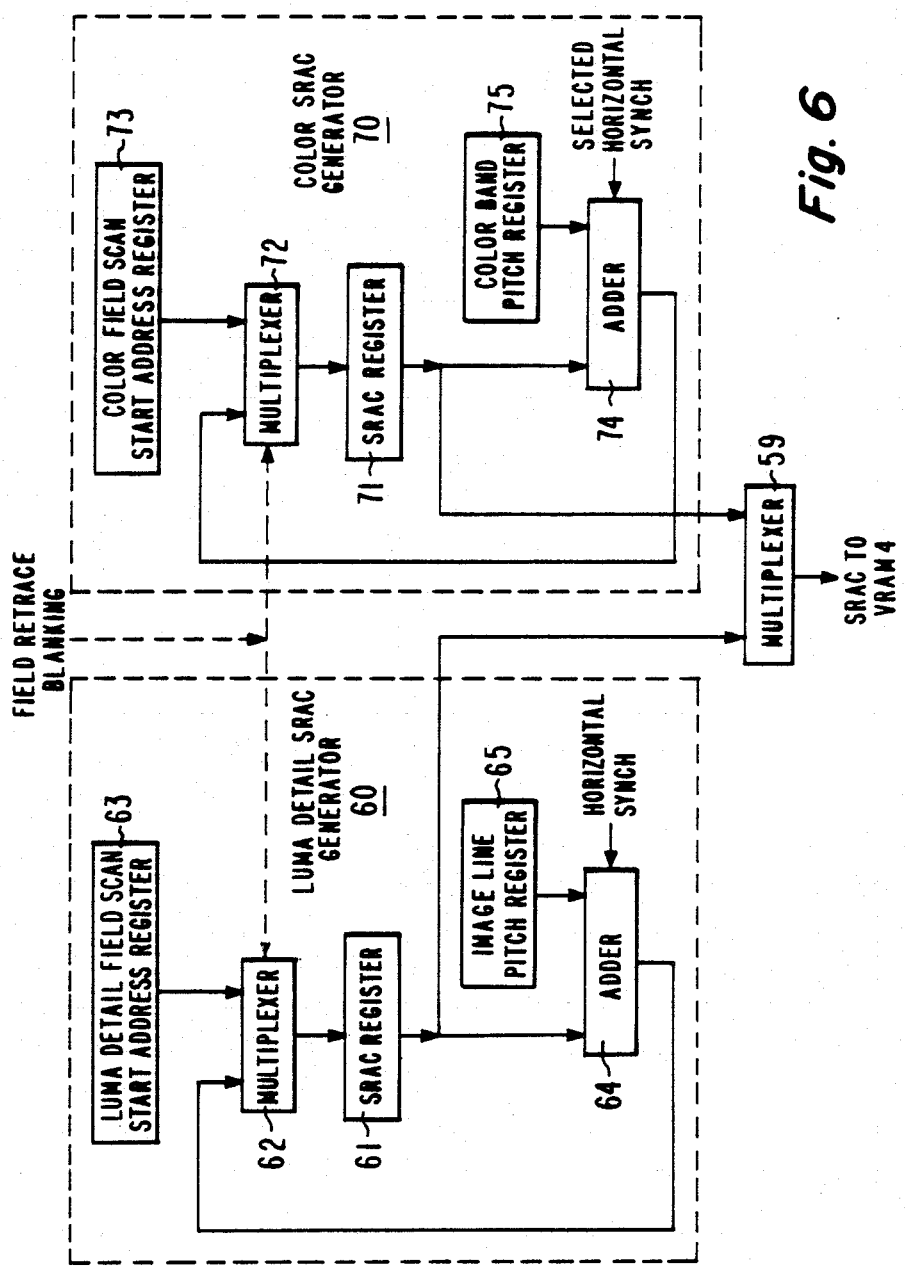
FIG. 6 is a schematic diagram of circuitry for generating the serial output port addressing for the FIG. 5 memory architecture.

FIG. 6 shows details of construction of the portion of VRAM read-out control 17 that generates SRAC in FIG. 1. SRAC is supplied to VRAM 4 from the output of a multiplexer 59 that selects the correct SRAC for the bit-map organization currently being scanned. This facilitates keeping track of where each scanning is along the linearly packed data of its particular bit-map organization. Two SRAC generators 60 and 70 are shown. Generator 60 generates SRAC for successive lines of luminance detail pixel data. Generator 70 generates SRAC for successive lines of narrowband color pixel data. To permit just one SRAC generator 70 for the red, green and blue descriptions of narrowband color rather than having to have three SRAC generators, these descriptions are linearly packed in VRAM 4 interleaving red, green and blue samples on a line by line basis.

SRAC generator 60 includes a SRAC latch register 61 for supplying a SRAC to one of the two inputs of multiplexer 59. SRAC latch register 61 contents are updated from the output of a multiplexer 62, controlled by FIELD RETRACE BLANKING pulses. During field retrace the FIELD RETRACE BLANKING pulse causes multiplexer 62 to select LUMA DETAIL FIELD SCAN START ADDRESS supplied from a short address register 63, for updating register 61 contents. LUMA DETAIL FIELD SCAN START ADDRESS identifies the storage location in VRAM 4 of the luminance detail pixel in the upper left corner of the following field. These LUMA DETAIL FIELD SCAN START ADDRESSES are selected in prescribed order from a listing in a portion of main computer memory reserved for storing display instructions, and the listing of LUMA FIELD SCAN START ADDRESSES is maintained by the drawing processor 3.

During field trace intervals in time, the absence of FIELD RETRACE BLANKING pulse causes multiplexer 62 to select the sum output of an adder 64 for updating SRAC latch register 61 contents. Adder 64 has addenda supplied to it from SRAC latch register 61 and from a programmable display line pitch latch register 65. IMAGE LINE PITCH stored in latch register 65 is the product of the number of luminance detail samples per image line times the number of bits per luminance-detail sample times the reciprocal of the number of bits per column address in VRAM 4—i.e., the number of luminance-detail bits per image line divided by thirty-two. Elements 61-65 are operated as an accumulator augmenting SRAC by IMAGE LINE PITCH during each line retrac interval. IMAGE LINE PITCH is loaded into latch register 65 by drawing processor 3. IMAGE LINE PITCH originates in compact disc player 2 or other video source, and it can be convenient to carry it in FIELD HEADER DATA preceding each field of bit-map-organized luminance detail or component color pixel data in VRAM 4.

SRAC generator 70 includes a SRAC latch register 71 for supplying a SRAC to the other of the two inputs of multiplexer 59, not supplied a SRAC from SRAC latch register 61 of SRAC generator 60. SRAC latch register 71 contents are updated from the output of a multiplexer 72 controlled by FIELD RETRACE BLANKING pulses. During a FIELD RETRACE BLANKING pulse, multiplexer 72 selects a COLOR FIELD SCAN START ADDRESS supplied from a start address register 73, for updating register 71 contents. COLOR FIELD SCAN START ADDRESS identifies the storage location in VRAM 4 of the red pixel in the upper right corner of the following field. These COLOR FIELD SCAN START ADDRESSES are listed together with LUMA DETAIL FIELD SCAN START ADDRESSES in the portion of main computer memory reserved for storing display instructions, and the listing of these COLOR FIELD SCAN START ADDRESSES is maintained by the drawing processor 3.

During field trace intervals in time, the absence of FIELD RETRACE BLANKING pulse causes multiplexer 72 to select the sum output of an adder 74 for updating SRAC latch register 71 contents. Adder 74 has addenda supplied to it from SRAC latch register 71 and from a programmable display band pitch register 75. A color display band is the number of display lines between the resampling of component color values. COLOR DISPLAY BAND PITCH stored in latch register 75 is the product of the number of color samples per color display band times the number of color-descriptive bits per color sample times the reciprocal of the number of bits per column address in VRAM 4—i.e., the number of color-descriptive bits per color display band divided by thirty-two. Elements 71-75 are operated as an accumulator augmenting SRAC by COLOR DISPLAY BAND PITCH during selected line retrace intervals separated by intervening color display band intervals. COLOR DISPLAY BAND PITCH is loaded into latch register 75 by drawing processor 3 and originates similarly to IMAGE LINE PITCH.

Figure 7:
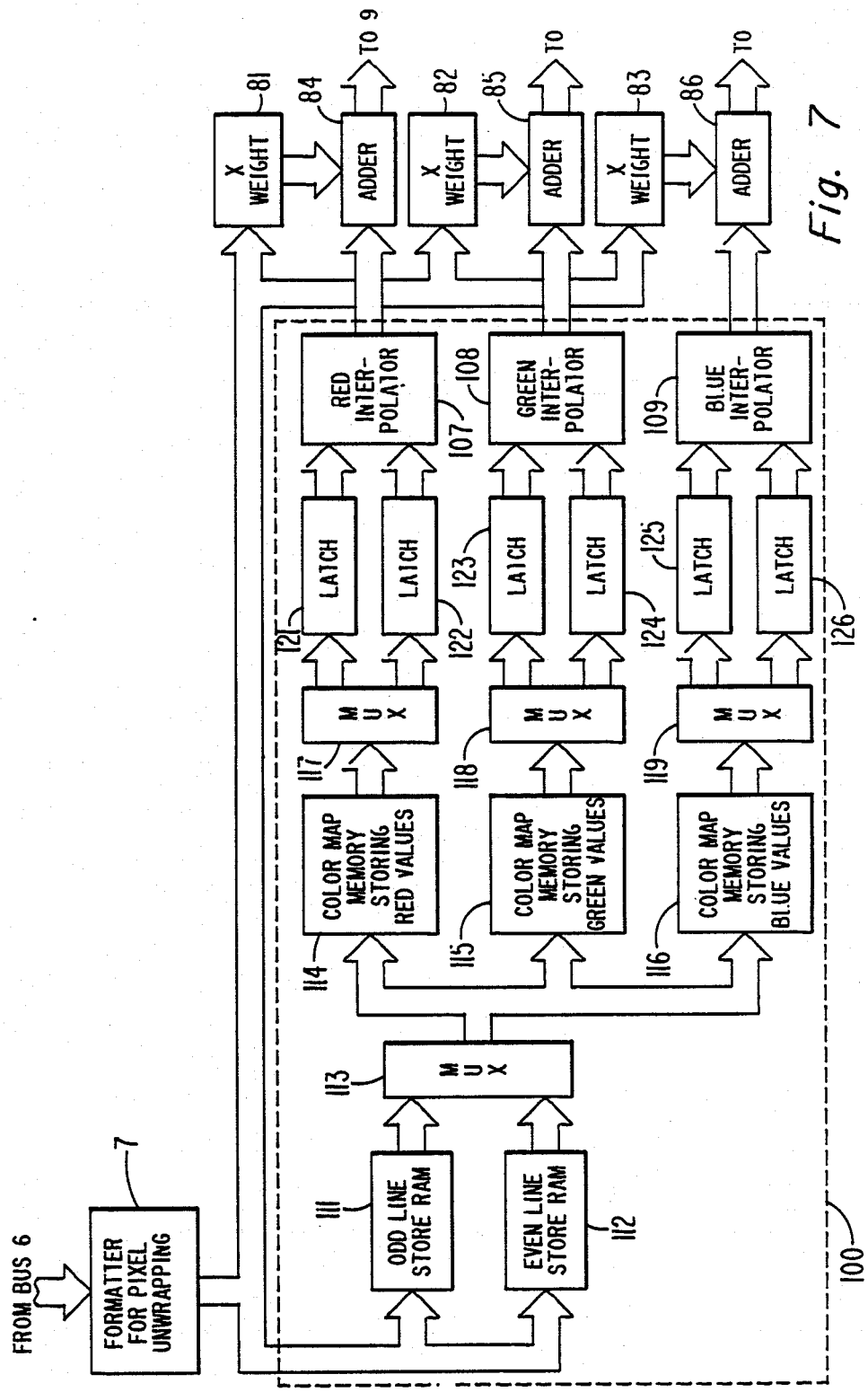
FIG. 7 is a schematic diagram of a modification that can be made to the FIG. 1 television display system in another embodiment of the invention.

FIG. 7 shows an alternative narrowband color resampling apparatus 100 that may replace resampling apparatus 10 in the FIG. 1 television display system. Resampling apparatus 100 permits the storage of color information in VRAM 4 in the form of read addresses for color map memories 115, 116 and 117 which store red, green and blue values, respectively. These read addresses can be expressed in shorter-bit-length color codes than those needed to express red, green and blue directly, assuming adaptive color coding is pursued. Color map memories 115, 116 and 117 are addressed in parallel, so only a single odd-line-store memory 111 and a single even-line-store memory 112 are required as rate-buffering memory for the time-compressed component color information.

Color map memory 115 is multiplexed by multiplexers 113 and 118 to convert the successive read address contents of line-store memories 111 and 112 to a stream of odd-line red samples and a stream of even-line red samples successively fed to latch 121 and to latch 122, respectively. The streams of samples supplied to latches 121 and 122 are offset slightly in time, but the paired samples in latches 121 and 122 are admitted parallelly in time into red interpolator 107.

Similarly, color map memory 116 is multiplexed by multiplexers 113 and 119, on the one hand, to convert the successive read address contents of line store memories 111 and 112 to a stream of odd-line green samples successively fed to latch 123 and, on the other hand, to convert the successive read address contents of line-store memories 111 and 112 to a stream of even-line green samples successively fed to latch 124. The paired samples in latches 123 and 124 are admitted parallelly in time into green interpolator 108.

Again similarly, color map memory 117 is multiplexed by multiplexers 114 and 120, on the one hand, to convert the successive read address contents of line store memories 111 and 112 to a stream of odd-line blue samples successively fed to latch 125 and, on the other hand, to convert the successive read address contents of line-store memories 111 and 112 to a stream of even-line blue samples successively fed to latch 126. The paired samples in latches 125 and 126 are admitted parallelly in time into green interpolator 109. The remainder of signal processing admixing luminance detail with the narrowband red, green and blue is done as in FIG. 1, using adders 84–86.

Figure 8:
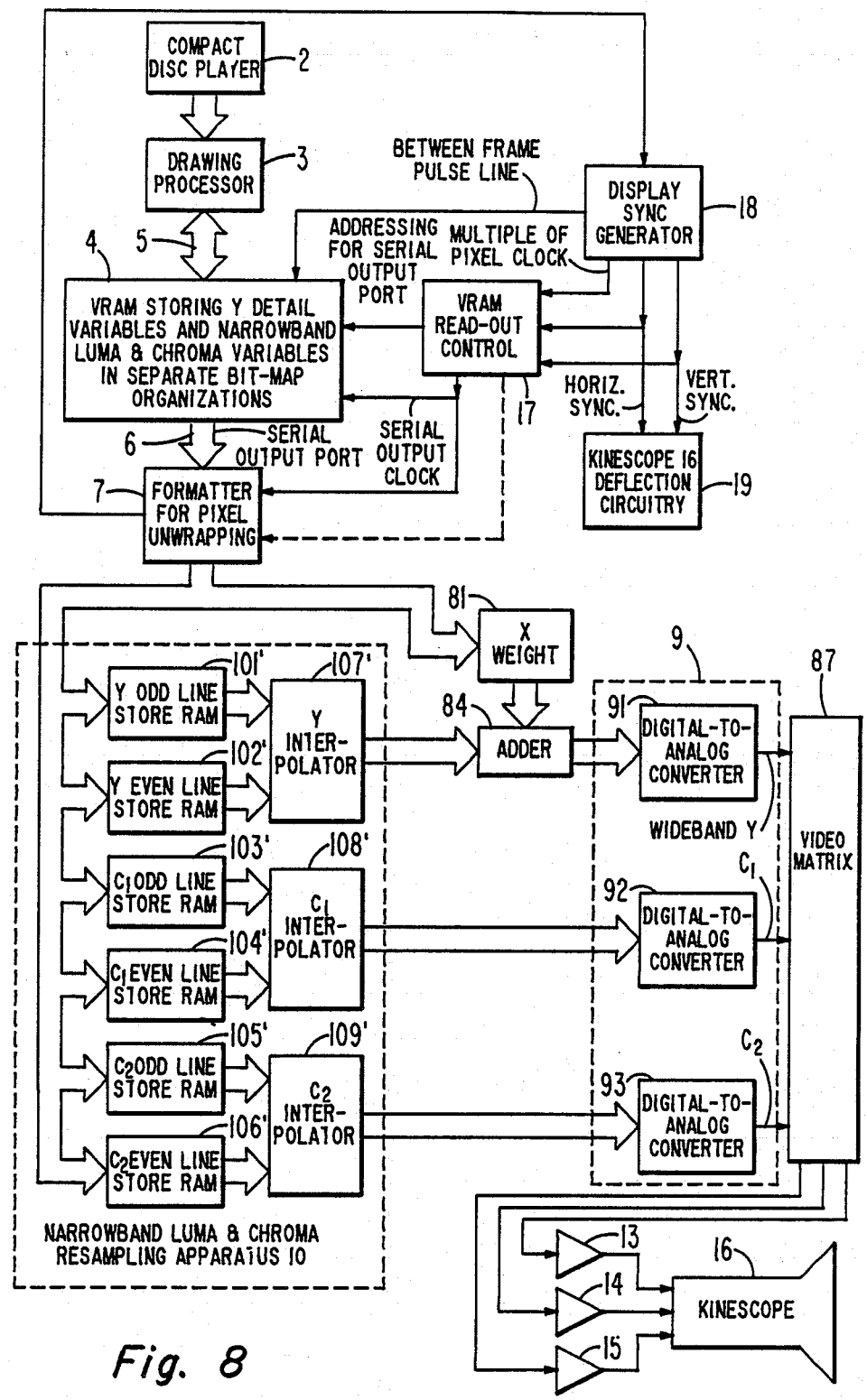
FIG. 8 is a schematic diagram of a television display system which embodies the invention. It is similar to the FIG. 1 television display system, but uses narrowband luminance and chrominance resampling apparatus, rather than narrowband color resampling apparatus.

FIG. 8 shows a television display system wherein narrowband luminance and chrominance variables are used together with a wideband luminance variable to code image data. VRAM 4 stores wideband luminance (or Y) detail samples in a separate bit-map organization that fully samples raster scan. VRAM 4 stores narrowband luminance and two narrowband color-difference or chrominance signals separately on a subsampled basis, preferably line-interleaving their respective subsampling rasters and using one bit-map organization for the combined subsampling rasters. Resampling apparatus 10' is the same as resampling apparatus 10 structurally, but processes a narrowband luminance signal, a narrowband first chrominance signal $C_1$ and a narrowband second chrominance signal $C_2$ rather than narrowband red signal, narrowband green signal and narrowband blue signal. Elements 101–109 of resampling apparatus 10 have primed counterparts in resampling apparatus 10'. Adder 84 sum output supplies wideband digital luminance signal to digital-to-analog conversion circuitry 9, which responds with a wideband analog luminance signal supplied to video matrixing circuitry 87. Multipliers 82 and 83 are dispensed with and if luminance detail is correctly weight respective to narrowband luminance weighting, multiplier 81 may be replaced by a direct connection from formatter 7 to adder 84 addend input. Adders 85 and 86 are dispensed with. Digital narrowband chrominance signals $C_1$ and $C_2$ are supplied by interpolators 108' and 109' to conversion circuitry 9, which responds to supply narrowband analog chrominance signals $C_1$ and $C_2$ to video matrixing circuitry 87. Video matrixing circuitry responds to the analog wideband luminance and narrowband chrominance signals to generate red, green and blue drive signals for video amplifiers 13, 14 and 15, respectively.

The $C_1$ and $C_2$ chrominance signals rather than being color difference signals, which have both positive and negative valees, may have offsets added to them to make them actual color signals. Analog video matrixing circuitry 87 after the digital-to-analog conversion circuitry 9 may be dispensed with, and digital video matrixing circuitry may be used before conversion circuitry 9 instead. Matrixing in the analog regime is advantageous in that it avoids digital multiplication.

Figure 9:
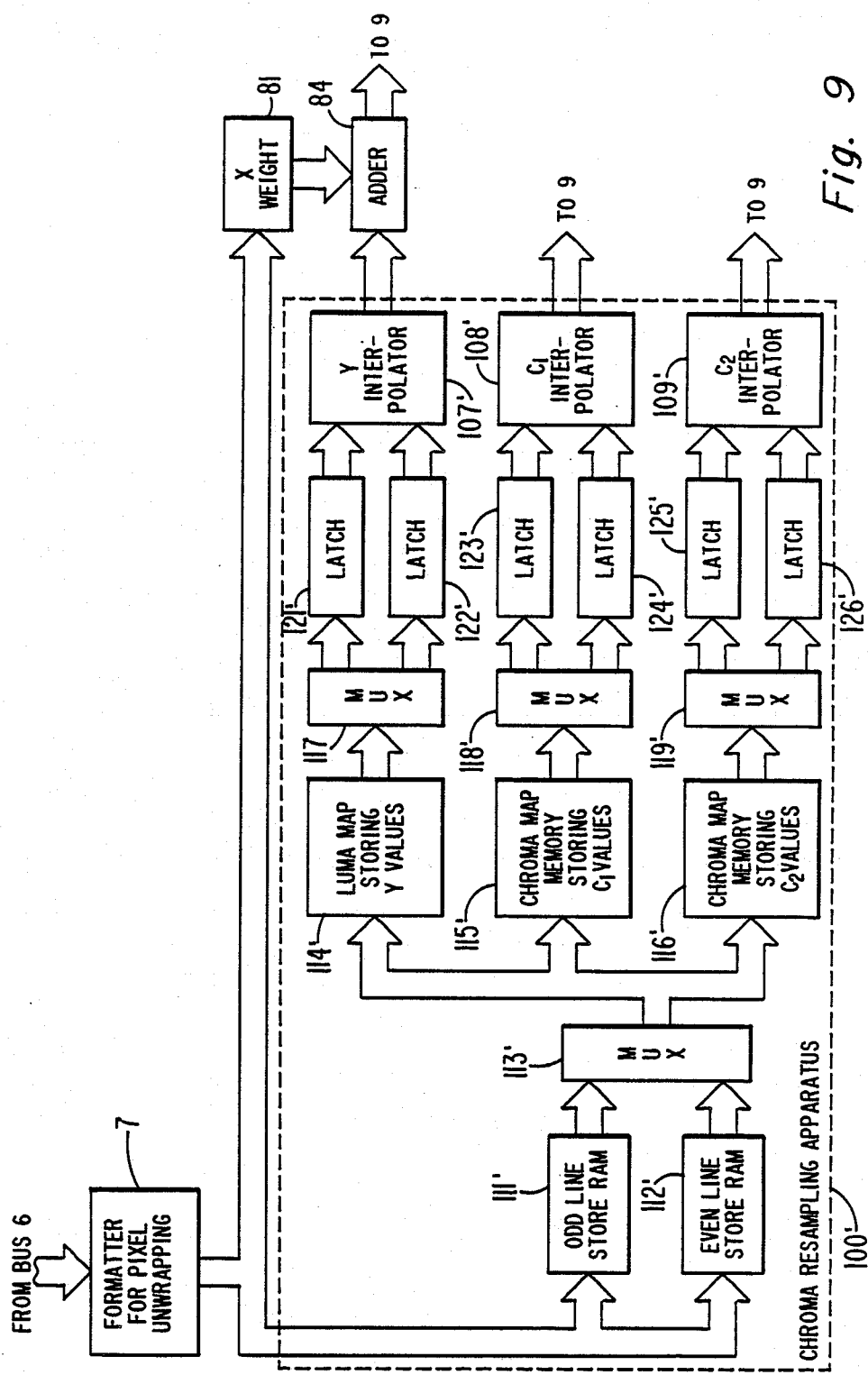
FIG. 9 is a schematic diagram of a modification that can be made to the FIG. 8 television display system in another embodiment of the invention.

FIG. 9 shows a resampling apparatus 100' that may replace resampling apparatus 10' in the FIG. 8 television display system. Resampling apparatus 100' structurally resembles resampling apparatus 100 of FIG. 7, and their corresponding elements are similarly numbered in each figure, the identification numerals in FIG. 9 being primed. The modified FIG. 8 television display system using resampling apparatus 100 is one where luminance details are stored in one bit-map organization in one portion of VRAM 4 and narrowband luminance and chrominance map memory addresses are stored in another bit-map organization in another portion of VRAM 4. The map memories 114', 115' and 116' store luminance signal (Y) values, first chrominance signal ($C_1$) values and second chrominance signal ($C_2$) values, respectively.

Figure 10:
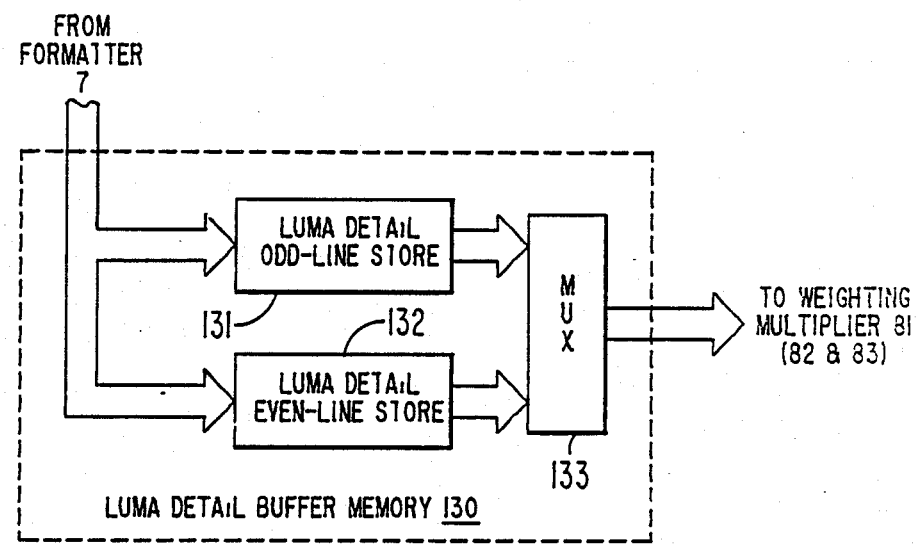
FIG. 10 is a schematic diagram of a modification that can be made to either of the FIG. 1 and FIG. 8 television display system, to provide for rate-buffering of luminance detail information read out of VRAM.

FIG. 10 shows a luminance detail rate-buffer memory 130 that may follow formatter 7 in the luminance detail channel 8 in a modification or further modification of either the FIG. 1 or the FIG. 8 television display system. Rate-buffer memory 130 includes a luminance detail odd-line store RAM 131 and a luminance detail even-line store RAM 132 that are written during respective time-interleaved sets of display line retrace intervals. The rate of writing line-store RAMs 131 and 132 may differ from the pixel scan rate in the display. Typically, it is higher, in order to extend the interval during which the line store RAMs 101–106 can be written, to include a portion of the line trace interval as well as the line retrace interval. During each display line trace interval in which one of the luminance-detail line store RAMs 131 and 132 is being written into, the other of RAMs 131 and 132 is being read from at the pixel scan rate. A multiplexer 133 selects this read-out as input signal to the weighting multipliers 81–83.

The manner in which video information is packed into the VRAM 4, in accordance with aspects of the invention, will now be described in further detail. In FIGS. 11–16 each rectangular box extending across the page is considered to represent a respective VRAM row. In the descriptions illustrated by FIGS. 11, 12 and 13, the three narrowband signals associated with wideband luminance detail will be denominated $N_1$, $N_2$ and $N_3$. If narrowband red, green and blue signals are used, $N_1$, $N_2$ and $N_3$ will correspond to respective ones of them. If a narrowband luminance signal and two narrowband color-difference (or color) signals are used, $N_1$, $N_2$ and $N_3$ will correspond to respective ones of them. It will be assumed that the $N_1$, $N_2$ and $N_3$ signals are sampled one quarter as densely as luminance detail both in the direction scan lines extend and in the direction of line advance. It will be assumed that there are a plurality $p+1$ in number of scan lines in the subsampled rasters of the $N_1$, $N_2$ and $N_3$ signals and that there are $4p+1$ scan lines in the fully-sampled luminance-detail raster. To keep the concepts of packing simpler to deal with, it will be assumed that luma detail, $N_1$, $N_2$ and $N_3$ samples have equal bit lengths in VRAM 4. One skilled in the art is capable of extending the packing concepts disclosed herein, to design memory packing arrangements where bit lengths are not alike for all samples, and to alter formatter 7 to suit.

FIG. 11 shows how a portion of VRAM 4 may be packed to store one image frame. At least one other portion of VRAM 4 will be similarly packed with another image frame (not shown because of drafting constraints.) These frames may be referred to as "odd frame" and "even frame", respectively. These terms should not be confused with the terms "odd field" and "even field" employed to describe successive fields forming a frame when line interlace schemes are pursued. Whether each frame is scanned on a one field per frame basis without line interlace, on a single-shuttered or plural-shuttered basis, or whether each frame is scanned on a two field per frame basis with line interlace on successive fields, in a single-shuttered or plural-shuttered basis, is essentially irrelevant to the VRAM packing. Whether line interlace on successive fields is used will, of course, be reflected in the contents of the pitch register of each SRAC generator.

In FIG. 11 each scan line of the luminance detail is shown occupying a respective row in VRAM 4. It is simplest from the standpoint of luma detail SRAC generator 60 to store successive lines of luminance detail in successive rows of VRAM 4, as shown in FIG. 11. It is assumed there are one quarter as many samples per scan line in the narrowband signals $N_1$, $N_2$ and $N_3$ as there are luminance detail samples. This allows four scan lines of narrowband signal per VRAM 4 row, if all samples are equal bit length. FIG. 11 shows the $N_1$ scan lines being successively packed, four to a row, in successive VRAM rows. The $N_2$ scan lines and the $N_3$ scan lines are similarly packed. This requires three separate SRAC generators, one for each of the $N_1$ and $N_2$ and $N_3$ variables.

Figure 12:
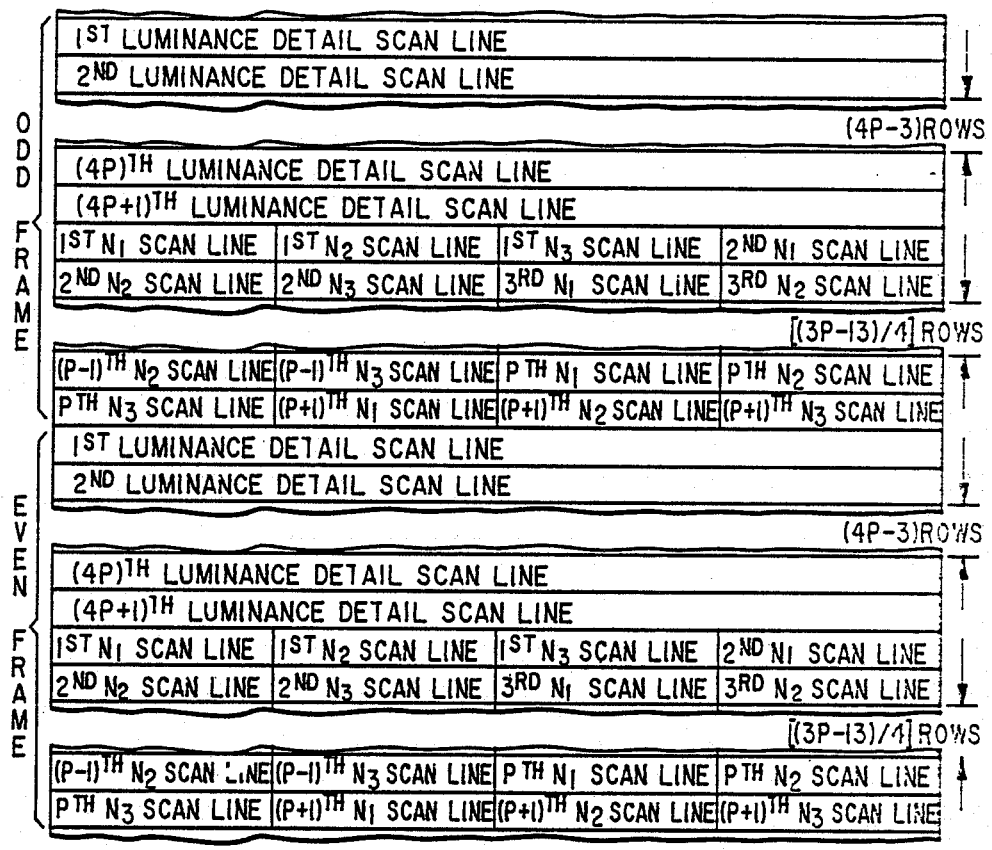

FIG. 12 shows a preferred way to pack VRAM 4 that allows a single SRAC generator 70 to generate VRAM addresses for all three of the $N_1$, $N_2$ and $N_3$ variables. The subsampled raster scans of $N_1$, $N_2$ and $N_3$ are interleaved on a per line basis. Then successive scan lines of the interleaving result are then parsed into four-scan-line segments for storage in respective rows of VRAM 4.

FIG. 13 shows a packing of VRAM 4 that differs from the FIG. 12 packing in the following ways. Two successive lines of luminance detail samples are entered into a VRAM row, rather than one. Eight scan lines of narrowband signal are entered into a VRAM row, rather than four.

In the packing schemes thusfar described, it is likely that the last few lines of narrowband signal will not fill a VRAM row, and this may also be so when a plurality of luma detail scan lines appear in each VRAM row. FIG. 14 shows a packing scheme where the likelihood of not filling VRAM rows is reduced. To do this, the luma detail scan lines of the odd and even image frames are stored together in contiguous portions of VRAM 4, and the narrowband signals of the odd and even image frames are stored together in contiguous portions of VRAM 4.

Figure 15:
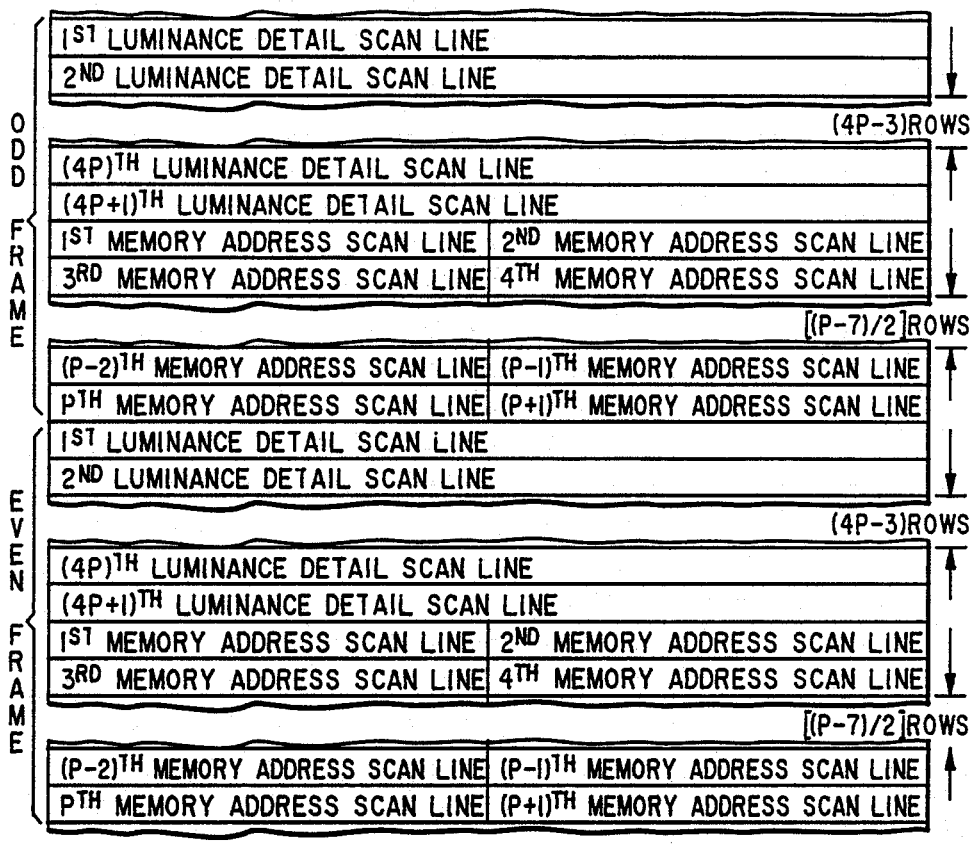

FIG. 15 shows any VRAM 4 may be packed when the narrowband signal resampling apparatus of FIGS. 7 or 9 is used. By way of example, assume luminance detail samples are padded to eight-bits per sample in VRAM. Narrowband red, green and blue signals of six, seven and five bit-lengths, respectively, are assumed to be stored in color map memories 114, 115 and 116, respectively. This provides a total of eighteen-bits to describe reproducible color space. Sixteen bits of color map addressing is assumed to be used for securing a quarter of the possible number of colors, savings in number of samples preferably being made by reducing the number of distinguishable colors in portions if color space where it is hard to distinguish hues. Low luminance levels may be monochromatic, for example. Alternatively, where values of luminance signal Y, first chrominance signal $C_1$ and second chrominance signal $C_2$ are stored in map memories 114', 115' and 116' these values may be the transforms of the red, green and blue values, selected for map purposes. In either case, the number of scan lines of memory address signal samples per row of VRAM 4 is one half the number of scan lines of luminance detail samples.

Figure 16:
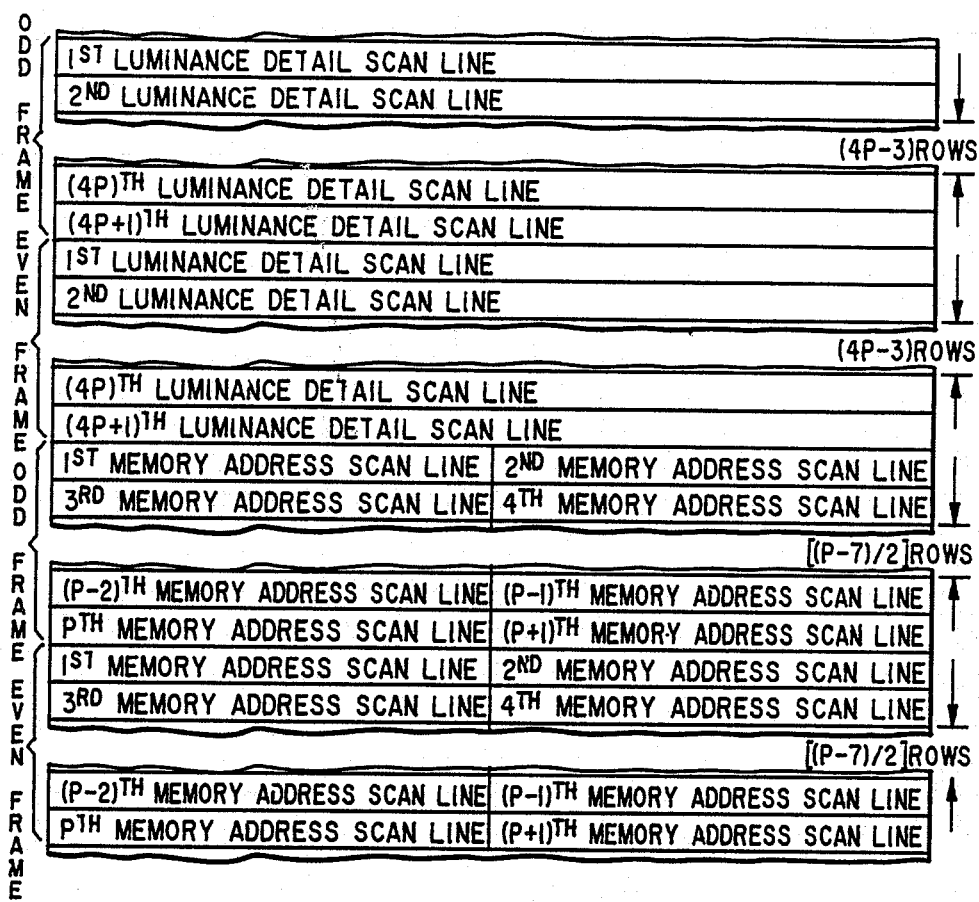

FIG. 16 shows another way to pack VRAM 4 when the narrowband signal resampling apparatus of FIGS. 7 or 9 is used. This way reduces the likelihood of not filling rows in VRAM 4.

One skilled in the art and equipped with the principles taught in describing FIGS. 11–16 can readily design a variety of other VRAM packing schemes consonant with the invention. For example, rather than interleaving $N_1$, $N_2$ and $N_3$ samples on a line-by-line basis as shown in FIGS. 12–14, one may choose to interleave them on a pixel-by-pixel basis, suitably altering the parsing of formatter 7 and the write addressing of line store memories 101–106. The packing in VRAM 4 of pixel-by-pixel interleaved narrowband color-component samples is done by dividing their interleaved raster scan into scan line segments, which are then packed into VRAM 4 similarly to the map memory write addresses in FIG. 15 or in FIG. 16.

A number of variants of the invention as thusfar described are possible. One may desire to have the three narrowband signals describe primary colors other than the additive primaries red, green and blue. For example, yellow, cyan and magenta primary colors may be used. The three narrowband signals may be Y, $C_1/Y$ and $C_2/Y$. That is, the $C_1$ and $C_2$ signals as stored in VRAM may be normalized respective to narrowband Y, as suggested by T. R. Craver and J. H. Arbeiter in U.S. Pat. No. 4,719,503, filed Oct. 14, 1986, entitled "DISPLAY PROCESSOR WITH COLOR MATRIXING CIRCUITRY AND TWO MAP MEMORIES STORING CHROMINANCE-ONLY DATA", and assigned to RCA Corporation. Normalization is removed by multiplying $C_1/Y$ and $C_2/Y$ by narrowband Y signal in generating the color drive signals to be applied to video amplifiers 13, 14 and 15.

In the embodiments of the invention shown in FIGS. 1, 7, 8, 9, 10 the luminance detail samples have been forwarded directly from formatter 7 to the weighting multiplier 81 (or to the weighting multipliers 81, 82 and 83). Rather than doing this, in other embodiments of the invention formatter 7 may forward luminance detail information in coded form as addresses for a luminance-detail map memory, the output data read from that map memory being used to supply input data to the weighting multiplier 81 (or to the weighting multipliers 81, 82 and 83). This permits luminance detail to be non-linearly processed, to conform to the response of the human eye to luminance detail, for example.

To achieve better compatibility between a system with wideband red, green and blue signals, it may be desirable to code the narrowband red, green and blue signals in numbers of bits which sum to an integral power of two. For example, red, green and blue signals may be coded in five bits, six bits, and five bits; and luminance detail may be coded in four bits. Variants of this are possible such as one in which red is coded in five bits, green is coded in six bits, blue is coded in four bits, and another narrowband signal such as a flag signal to control display mode is coded in one bit.

What is claimed is:

1. A system for storing and retrieving electric signals descriptive of color images, said system comprising:
   a video random-access memory having a multiplicity of storage locations, an input port and a serial-access output port;
   means for writing electric signals descriptive of color images into said video random-access memory via its input port for storage in storage locations thereof in accordance with separate bit-map organizations for luminance detail information and for narrowband component color information, there being a relatively densely sampled bit-map organization for luminance detail information and at least one relatively sparsely sampled bit-map organization for narrowband color-component information;
   means for selecting successive rows of storage locations storing luminance detail information for reading out from said video random-access memory via its serial-access output port, one row per display line trace interval;
   means for selecting successive rows of storage locations storing narrowband color-component information for read out from said video random-access memory via its serial-access output port, during selected display line retrace intervals;
   means for resampling said narrowband color-component information to the same sampling density as said luminance detail information;
   means for temporally aligning corresponding samples of luminance detail information and narrowband color-component information of the same sampling density; and
   means for generating wideband color signals by combining said temporally aligned corresponding samples of luminance detail information and narrowband color-component information.

2. A system as set forth in claim 1 wherein said bit-map organizations are linearly packed in said video random-access memory.

3. A system as set forth in claim 2 wherein the color-component information comprises three primary color signals, the information-bearing bit lengths of which are proportioned with regard to the respective contributions to narrowband luminance.

4. A system as set forth in claim 3 wherein the number of bits in the luminance detail description of each picture element is no larger than the number of bits assigned to samples of any of the three primary color signals.

5. A system as set forth in claim 4 wherein the green color signal samples have seven bits subject to change, the red color signal samples have six bits subject to change, and the blue color signal samples have five bits subject to change.

6. A system as set forth in claim 5 wherein the luminance detail samples have five bits subject to change.

7. A system as set forth in claim 2 wherein the color-component information comprises a narrowband luminance signal and two other narrowband signals.

8. A system for storing and retrieving electric signals descriptive of color images, said system comprising:
   a video random-access memory having a multiplicity of storage locations, an input port and a serial-access output port;
   means for writing electric signals descriptive of color images into said video random-access memory via its input port for storage in storage locations thereof in accordance with a relatively densely sampled bit-map organization for luminance detail information and a relatively sparsely sampled bit-map organization for narrowband color-component information;
   means for selecting successive rows of storage locations storing luminance detail information in said densely sampled bit-map organization, for reading out from said video random-access memory via its serial-access output port during each line trace intervals of display;
   means for selecting successive rows of storage locations storing narrowband color-component information in said sparsely sampled bit-map organization, for reading out from said video random-access memory via its serial-access output port during selected line retrace intervals of display;
   a first line storage memory, for storing samples of odd-numbered scan lines of narrowband first color-component color information, having an input port to which the serial-access output port of said video random-access memory is connected, and having an output port;
   a second line storage memory, for storing samples of even-numbered scan lines of narrowband first color-component color information, having an input port to which the serial-access output port of said video random-access memory is connected, and having an output port;
   a first two-dimensional spatial interpolator of pipeline type, having two input ports and an output port;
   means operative during selected times for reading out from the output ports of said first and second line storage memories in parallel to the input ports of said first two-dimensional spatial interpolator, said selected times being such as to temporally align samples of narrowband first color-component information, as supplied from the output port of said first two-dimensional spatial interpolator and resampled to the same sampling density as luminance detail information, with corresponding samples of luminance detail information, as supplied from the serial-access output port of said video random-access memory during display line trace intervals;

a third line storage memory, for storing samples of odd-numbered scan lines of narrowband second color-component color information, having an input port to which the serial-access output port of said video random-access memory is connected, and having an output port;

a fourth line storage memory, for storing samples of even-numbered scan lines of narrowband second color-component color information, having an input port to which the serial-access output port of said video random-access memory is connected, and having an output port;

a second two-dimensional spatial interpolator of pipeline type, having two input ports and an output port;

means operative during selected times for reading out from the output ports of said third and fourth line storage memories in parallel to the input ports of said second two-dimensional spatial interpolator said selected times being such as to temporally align samples of narrowband second color-component information, as supplied from the output port of said second two-dimensional spatial interpolator and resampled to the same sampling density as luminance detail information samples, with corresponding samples of luminance detail, as supplied from the serial-access output port of said video random-access memory during display line trace intervals;

a fifth line storage memory, for storing samples of odd-numbered scan lines of narrowband third color-component information, having an input port to which the serial-access output port of said video random-access memory is connected, and having an output port;

a sixth line storage memory, for storing samples of even-numbered scan lines of narrowband third color-component information, having an input port to which the serial-access output port of said video random-access memory is connected, and having an output port;

a third two-dimensional spatial interpolator of pipeline type, having two input ports and an output port;

means operative during selected times for reading out from the output ports of said fifth and sixth line storage memories in parallel to the input ports of said third two-dimensional spatial interpolator said selected times being such as to temporally align samples of narrowband third color-component information, as supplied from the output port of said third two-dimensional spatial interpolator and resampled to the same sampling density as luminance detail information, with corresponding samples of luminance detail information, as supplied from the serial-access output port of said video random-access memory during display line trace intervals; and means for generating three wideband color-component signals from said narrowband first color-component information, said narrowband second color-component information, said narrowband third color-component information, and said wideband luminance detail information.

9. A system as set forth in claim 8 wherein said resampled narrowband first color-component information is resampled narrowband red information, wherein said resampled narrowband second color-component information is resampled narrowband green information, wherein said resampled narrowband third color-component information is resampled narrowband blue information, and wherein said means for generating three wideband color-component signals comprises:

means, weighting said luminance detail information and adding the result to said resampled narrowband red information, for generating a wideband red signal;

means, weighting said luminance detail information and adding the result to said resampled narrowband green information, for generating a wideband green signal; and means, weighting said luminance detail information and adding the result to said resampled narrowband blue information, for generating a wideband blue signal.

10. A system as set forth in claim 9 in combination with:

means for converting said wideband red signal, said wideband green signal and said wideband blue signal to respective red, green and blue analog signals;

first, second and third video amplifiers for said red, green and blue analog signals, respectively; and a color kinescope receptive of amplified red, green and blue analog signals as supplied thereto by said first, second and third video amplifiers.

11. A system as set forth in claim 8 wherein said first resampled narrowband color-component information is resampled narrowband luminance information and wherein means for generating three wideband color component signals comprises:

means combining said wideband luminance detail information, said resampled narrowband luminance information and some of at least one of said resampled narrowband second color-component information and said resampled third narrowband third color-component information for generating a wideband red signal.

means combining said wideband luminance detail information, said resampled narrowband luminance information and some of at least one of said resampled narrowband second color-component information and said resampled narrowband third color-component information for generating a wideband green signal.

means combining said wideband luminance detail information, said resampled narrowband luminance information and some of at least one of said resampled narrowband second color-component information and said resampled narrowband third color-component information for generating a wideband blue signal.

12. A system as set forth in claim 11 in combination with:

means for converting said wideband red signal, said wideband green signal and said wideband blue signal to respective red, green and blue analog signals;

first, second and third video amplifiers for said red, green and blue analog signals, respectively; and a color kinescope receptive of amplified red, green and blue analog signals as supplied thereto by said first, second and third video amplifiers.

13. A system as set forth in claim 8 wherein said first two-dimensional spatial interpolator of pipe-line type comprises:
- a first multiplexer for selection on a scan line by scan line basis between, on the one hand, read-out supplied to one input port of said first two-dimensional spatial interpolator from the output port of said first line storage memory and, on the other hand, read-out supplied to the other input port of said first two-dimensional spatial interpolator from the output port of said second line storage memory;
- means for making simultaneously available the current selection and the just previous selection of said first multiplexer;
- means for obtaining half the sum of the current selection of said first multiplexer and of its just previous selection;
- means for summing the read-outs supplied the input ports of said first two-dimensional spatial interpolator from the output ports of said first and second line storage memories;
- means for matrixing simultaneously available, on the one hand, half the sum of the just previous read-outs supplied the input ports of said first two-dimensional spatial interpolator and, on the other hand, one quarter the sum of the current and just-previous read-outs supplied the input ports of said first two-dimensional spatial interpolator; and
- a second multiplexer for selecting on a pixel by pixel basis among the just-previous selection of said first multiplexer, half the sum of the current selection of said first multiplexer and of its just previous selection, half the sum of the just-previous read-outs supplied to the input ports of said first two-dimensional spatial interpolator, and one-quarter the sum of the current and just-previous read-outs supplied to the input ports of said first two-dimensional spatial interpolator—wherein said second two-dimensional spatial interpolator of pipe-line type comprises:
- a third multiplexer for selection on a scan line by scan line basis between, on the one hand, read-out supplied to one input port of said second two-dimensional spatial interpolator from the output port of said third line storage memory and, on the other hand, read-out supplied to the other input port of said second two-dimensional spatial interpolator from the output port of said fourth line storage memory;
- means for making simultaneously available the current selection and the just previous selection of said third multiplexer;
- means for obtaining half the sum of the current selection of said third multiplexer and of its just previous selection;
- means for summing the read-outs supplied the input ports of said second two-dimensional spatial interpolator from the output ports of said third and fourth line storage memories;
- means for making simultaneously available, on the one hand, half the sum of the just previous read-outs supplied the input ports of said second two-dimensional spatial interpolator and, on the other hand, one quarter the sum of the current and just-previous read-outs supplied the input ports of said second two-dimensional spatial interpolator; and
- a fourth multiplexer for selecting on a pixel by pixel basis among the just-previous selection of said third multiplexer, half the sum of the current selection of said third multiplexer and of its just previous selection, half the sum of the just-previous read-outs supplied to the input ports of said second two-dimensional spatial interpolator, and one-quarter the sum of the current and just-previous read-outs supplied to the input ports of said second two-dimensional spatial interpolator—and wherein said third two-dimensional spatial interpolator of pipe-line type comprises:
- a fifth multiplexer for selection on a scan line by scan line basis between, on the one hand, read-out supplied to one input port of said second two-dimensional spatial interpolator from the output port of said fifth line storage memory and, on the other hand, read-out supplied to the other input port of said third two-dimensional spatial interpolator from the output port of said sixth line storage memory;
- means for making simultaneously available the current selection and the just previous selection of said fifth multiplexer;
- means for obtaining half the sum of the current selection of said fifth multiplexer and of its just previous selection;
- means for summing the read-outs supplied the input ports of said third two-dimensional spatial interpolator from the output ports of said fifth and sixth line storage memories;
- means for making simultaneously available, on the one hand, half the sum of the just previous read-outs supplied the input ports of said third two-dimensional spatial interpolator and, on the other hand, one quarter the sum of the current and just-previous read-outs supplied the input ports of said third two-dimensional spatial interpolator; and
- a sixth multiplexer for selecting on a pixel by pixel basis among the just-previous selection of said fifth multiplexer, half the sum of the current selection of said fifth multiplexer and of its just previous selection, half the sum of the just-previous read-outs supplied to the input ports of said third two-dimensional spatial interpolator, and one-quarter the sum of the current and just-previous read-outs supplied to the input ports of said third two-dimensional spatial interpolator—and wherein said third two-dimensional spatial interpolator.

14. A system as set forth in claim 8 wherein said first two-dimensional spatial interpolator of pipe-line type comprises:
- an output multiplexer for said first two-dimensional spatial interpolator, which has first and second input ports and has an output port that is the output port of said first two-dimensional spatial interpolator; and
- a cascade connection of a first plurality two-input-terminal, two-output-terminal interpolator modules between the output ports of said first and second line storage memories and the input ports of said output multiplexer for said first two-dimensional spatial interpolator—wherein said second spatial interpolator of pipe-line type comprises;
- an output multiplexer for said second two-dimensional spatial interpolator, which has first and second input ports and has an output port that is the output port of said second two-dimensional spatial interpolator; and a cascade connection of a second plurality of two-input-terminal interpolator modules between the output ports of said third and fourth line storage memories and the input ports of said output multiplexer for said second two-dimensional spatial interpolator—wherein said third spatial interpolator of pipe-line type comprises;

an output multiplexer for said third two-dimensional spatial interpolator, which has first and second input ports and has an output port that is the output port of said third two-dimensional spatial interpolator; and a cascade connection of a third plurality of two-input-terminal interpolator modules between the output ports of said fifth and sixth line storage memories and the input ports of said output multiplexer for said third two-dimensional spatial interpolator—and wherein each interpolator module in said first, second and third pluralities of interpolator modules comprises:

a respective input multiplexer for selection between first and second ones of the input terminals of that interpolator module;

respective means for making simultaneously available the current selection and the just-previous selection of the input multiplexer of that interpolator module;

means for obtaining half the sum of the current and just-previous selections of its respective input multiplexer;

a respective first output multiplexer for selecting to a first one of the output terminals of that interpolator module from between, on the one hand, the just-previous selection of the input multiplexer of that interpolator module and, on the other hand, said half the sum of the current and just-previous selections of the input multiplexer of that interpolator module;

respective means for summing the read-outs supplied to the first and second input terminals of that interpolator module;

respective means for making simultaneously available one half the just-previous sum of the read-outs supplied to the first and second input terminals of that interpolator module, and one quarter the sum of the current and just-previous sums of those read-outs; and a respective second output multiplexer for selecting to a second one of the output terminals of that interpolator module from between, on the one hand, one half the just-previous sum of the read-outs supplied to the first and second input terminals of that interpolator module and, on the other hand, one quarter the sum of the current and just-previous sums of those read-outs.

15. A system for storing and retrieving electric signals descriptive of color images, said system comprising:

a video random-access memory having a multiplicity of storage locations, having an input port and having a serial-access output port;

means for writing electric signals descriptive of color images into said video random-access memory via its input port for storage in storage locations thereof in accordance with a relatively densely sampled bit-map organization for luminance detail information and a relatively sparsely sampled bit-map organization for color map read address information;

means for selecting successive rows of storage locations storing luminance detail information in said densely sampled bit-map organization for reading out from said video random-access memory via its serial-access output port during each line trace interval of display;

means for selecting successive rows of storage locations storing color map read address information in said sparsely sampled bit-map organization for read out from said video random-access memory via its serial-access output port, during selected display line retrace intervals;

a first line storage memory for storing, during two line scan times, samples of odd-numbered scan lines of color map read address information, having an input port to which the serial-access output port of said video random-access memory is connected, and having an output port;

a second line storage memory for storing, during two line scan times, samples of even-numbered scan lines of color map read address information, having an input port to which the serial-access output port of said video random-access memory is connected, and having an output port;

means, operative during the reading out of said first and second line storage memories during display line trace intervals, for multiplexing alternatively from the output port of said first line storage memory and the output port of said second line storage memory to provide a stream of time-interleaved color map read address information samples;

a first color map memory receptive of said stream of time-interleaved color map read address information samples for generating a stream of corresponding samples of narrowband first color-component information;

a first two-dimensional spatial interpolator of pipe-line type, having two input ports and an output port;

means for temporally aligning samples of narrowband first color-component information generated in response to samples of color map read address information from said first line storage memory and from said second line storage memory, for application to respective ones of the input ports of said first two-dimensional spatial interpolator responsive to which said first two-dimensional spatial interpolator generates at its output port narrowband first color-component information at its output port sampled to the same sampling density as said luminance detail information;

a second color map memory receptive of said stream of time-interleaved color map read address information samples for generating a stream of corresponding samples of narrowband second color-component information;

a second two-dimensional spatial interpolator of pipe-line type, having two input ports and an output port;

means for temporally aligning samples of narrowband second color-component information generated in response to samples of color map read address information from said first line storage memory and from said second line storage memory, for application to respective ones of the input ports of said second two-dimensional spatial interpolator, responsive to which said second two-dimensional spatial interpolator generates at its output port narrowband second color-component information resampled to the same sampling density as said luminance detail information;

a third color map memory receptive of said stream of time-interleaved color map read address information samples for generating a stream of corresponding samples of narrowband blue component color information;

a third two-dimensional spatial interpolator of pipe-line type, having two input ports and an output port;

means for temporally aligning samples of narrowband third color-component information generated in response to samples of color map read address information from said first line storage memory and from said second line storage memory, for application to respective ones of the input ports of said third two-dimensional spatial interpolator, responsive to which said third two-dimensional spatial interpolator generates at its output port narrowband third color-component information resampled to the same density as said luminance detail information; and means for generating three wideband color-component signals from said narrowband first color-component information, said narrowband second color-component information, said narrowband third color-component information, and said wideband luminance detail information.

16. A system as set forth in claim 15 wherein said resampled narrowband first color-component information is resampled narrowband red information, wherein said resampled narrowband second color-component information is resampled narrowband green information, wherein said resampled narrowband third color-component information is resampled narrowband blue information, and wherein said means for generating three wideband color-component signals comprises:

means, weighting said luminance detail information and adding the result to said resampled narrowband red information, for generating a wideband red signal;

means, weighting said luminance detail information and adding the result to said resampled narrowband green information, for generating a wideband green signal; and means, weighting said luminance detail information and adding the result to said resampled narrowband blue information, for generating a wideband blue signal.

17. A system as set forth in claim 16 in combination with:

means for converting said wideband red signal, said wideband green signal and said wideband blue signal to respective red, green and blue analog signals;

first, second and third video amplifiers for said red, green and blue analog signals, respectively; and a color kinescope receptive of amplified red, green and blue analog signals as supplied thereto by said first, second and third video amplifiers.

18. A system as set forth in claim 15 wherein said first resampled narrowband color-component information is resampled narrowband luminance information and wherein means for generating three wideband color component signals comprises:

means combining said wideband luminance detail information, said resampled narrowband luminance information and some of at least one of said resampled narrowband second color-component information and said resampled third narrowband third color-component information for generating a wideband red signal.

means combining said wideband luminance detail information, said resampled narrowband luminance information and some of at least one of said resampled narrowband second color-component information and said resampled narrowband third color-component information for generating a wideband green signal.

means combining said wideband luminance detail information, said resampled narrowband luminance information and some of at least one of said resampled narrowband second color-component information and said resampled narrowband third color-component information for generating a wideband blue signal.

19. A system as set forth in claim 18 in combination with:

means for converting said wideband red signal, said wideband green signal and said wideband blue signal to respective red, green and blue analog signals;

first, second and third video amplifiers for said red, green and blue analog signals, respectively; and a color kinescope receptive of amplified red, green and blue analog signals as supplied thereto by said first, second and third video amplifiers.

20. A system as set forth in claim 15 wherein said first two-dimensional spatial interpolator of pipe-line type comprises:

a first multiplexer for selection on a scan line by scan line basis between, on the one hand, read-out supplied to one input port of said first two-dimensional spatial interpolator from the output port of said first line storage memory and, on the other hand, read-out supplied to the other input port of said first two-dimensional spatial interpolator from the output port of said second line storage memory;

means for making simultaneously available the current selection and the just previous selection of said first multiplexer;

means for obtaining half the sum of the current selection of said first multiplexer and of its just previous selection;

means for summing the read-outs supplied the input ports of said first two-dimensional spatial interpolator from the output ports of said first and second line storage memories;

means for matrixing simultaneously available, on the one hand, half the sum of the just previous read-outs supplied the input ports of said first two-dimensional spatial interpolator and, on the other hand, one quarter the sum of the current and just-previous read-outs supplied the input ports of said first two-dimensional spatial interpolator; and a second multiplexer for selecting on a pixel by pixel basis among the just-previous selection of said first multiplexer, half the sum of the current selection of said first multiplexer and of its just previous selection, half the sum of the just-previous read-outs supplied to the input ports of said first two-dimensional spatial interpolator, and one-quarter the sum of the current and just-previous read-outs supplied to the input ports of said first two-dimensional spatial interpolator—wherein said second two-dimensional spatial interpolator of pipe-line type comprises:

a third multiplexer for selection on a scan line by scan line basis between, on the one hand, read-out supplied to one input port of said second two-dimensional spatial interpolator from the output port of said third line storage memory and, on the other hand, read-out supplied to the other input port of said second two-dimensional spatial interpolator from the output port of said fourth line storage memory;

means for making simultaneously available the current selection and the just previous selection of said third multiplexer;

means for obtaining half the sum of the current selection of said third multiplexer and of its just previous selection;

means for summing the read-outs supplied the input ports of said second two-dimensional spatial interpolator from the output ports of said third and fourth line storage memories;

means for making simultaneously available, on the one hand, half the sum of the just previous read-outs supplied the input ports of said second two-dimensional spatial interpolator and, on the other hand, one quarter the sum of the current and just-previous read-outs supplied the input ports of said second two-dimensional spatial interpolator; and a fourth multiplexer for selecting on a pixel by pixel basis among the just-previous selection of said third multiplexer, half the sum of the current selection of said third multiplexer and of its just previous selection, half the sum of the just-previous read-outs supplied to the input ports of said second two-dimensional spatial interpolator, and one-quarter the sum of the current and just-previous read-outs supplied to the input ports of said second two-dimensional spatial interpolator—and wherein said third two-dimensional spatial interpolator of pipe-line type comprises:

a fifth multiplexer for selection on a scan line by scan line basis between, on the one hand, read-out supplied to one input port of said second two-dimensional spatial interpolator from the output port of said fifth line storage memory and, on the other hand, read-out supplied to the other input port of said third two-dimensional spatial interpolator from the output port of said sixth line storage memory;

means for making simultaneously available the current selection and the just previous selection of said fifth multiplexer;

means for obtaining half the sum of the current selection of said fifth multiplexer and of its just previous selection;

means for summing the read-outs supplied the input ports of said third two-dimensional spatial interpolator from the output ports of said fifth and sixth line storage memories;

means for making simultaneously available, on the one hand, half the sum of the just previous read-outs supplied the input ports of said third two-dimensional spatial interpolator and, on the other hand, one quarter the sum of the current and just-previous read-outs supplied the input ports of said third two-dimensional spatial interpolator; and a sixth multiplexer for selecting on a pixel by pixel basis among the just-previous selection of said fifth multiplexer, half the sum of the current selection of said fifth multiplexer and of its just previous selection, half the sum of the just-previous read-outs supplied to the input ports of said third two-dimensional spatial interpolator, and one-quarter the sum of the current and just-previous read-outs supplied to the input ports of said third two-dimensional spatial interpolator—and wherein said third two-dimensional spatial interpolator.

21. A system as set forth in claim 15 wherein said first two-dimensional spatial interpolator of pipe-line type comprises:

an output multiplexer for said first two-dimensional spatial interpolator, which has first and second input ports and has an output port that is the output port of said first two-dimensional spatial interpolator; and a cascade connection of a first plurality two-input-terminal, two-output-terminal interpolator modules between the output ports of said first and second line storage memories and the input ports of said output multiplexer for said first two-dimensional spatial interpolator—wherein said second spatial interpolator of pipe-line type comprises;

an output multiplexer for said second two-dimensional spatial interpolator, which has first and second input ports and has an output port that is the output port of said second two-dimensional spatial interpolator; and a cascade connection of a second plurality of two-input-terminal intepolator modules between the output ports of said third and fourth line storage memories and the input ports of said output multiplexer for said second two-dimensional spatial interpolator—wherein said third spatial interpolator of pipe-line type comprises;

an output multiplexer for said third two-dimensional spatial interpolator, which has first and second input ports and has an output port that is the output port of said third two-dimensional spatial interpolator; and a cascade connection of a third plurality of two-input-terminal interpolator modules between the output ports of said fifth and sixth line storage memories and the input ports of said output multiplexer for said third two-dimensional spatial interpolator—and wherein each interpolator module in said first, second and third pluralities of interpolator modules comprises:

a respective input multiplexer for selection between first and second ones of the input terminals of that interpolator module;

respective means for making simultaneously available the current selection and the just-previous selection of the input multiplexer of that interpolator module;

means for obtaining half the sum of the current and just-previous selections of its respective input multiplexer;

a respective first output multiplexer for selecting to a first one of the output terminals of that interpolator module from between, on the one hand, the just-previous selection of the input multiplexer of that interpolator module and, on the other hand, said half the sum of the current and just-previous selections of the input multiplexer of that interpolator module;

respective means for summing the read-outs supplied to the first and second input terminals of that interpolator module;

respective means for making simultaneously available one half the just-previous sum of the read-outs supplied to the first and second input terminals of that interpolator module, and one quarter the sum of the current and just-previous sums of those read-outs; and a respective second output multiplexer for selecting to a second one of the output terminals of that interpolator module from between, on the one hand, one half the just-previous sum of the read-outs supplied to the first and second input terminals of that interpolator module and, on the other hand, one quarter the sum of the current and just-previous sums of those read-outs.

22. A method of packing a video random-access memory with a frame or succession of frames of color video data comprising the steps of:

describing the luminance detail values of said frame or succession of frames in digitized sampled-data terms;

arranging the bits of each of the digitized sampled-data luminance detail values in a prescribed serial order according to their significance;

stringing the digitized sampled-data luminance detail values in prescribed serial order in accordance with a raster scan order of display, to generate a luminance detail bit stream;

dividing the luminance detail bit stream into lengths not longer than the number of bits per row of said video random-access memory, for writing into respective rows of said video random-access memory;

describing first, second and third narrowband color-component values of said frame or succession of frames in digitized sampled-data terms;

arranging the bits of each of the digitized sampled-data narrowband color-component values in a prescribed serial oreer according to their significance;

stringing the digitized sampled-data narrowband color-component values in prescribed serial order in accordance with a raster scan order of display, to generate a narrowband color-component bit stream; and dividing the narrowband color-component bit stream into lengths not longer than the number of bits per row of said video random-access memory, for writing into respective further rows of said video random-access memory.

23. The method set forth in claim 22 wherein said step of describing first, second and third narrowband color-component values of said frame or succession of frames in digitized sampled-data terms is carried out so that said first narrowband color-component values are narrowband red color-component values, said second narrowband color-component values are narrowband green color-component values, and said third narrowband color-component values are narrowband blue color-component values.

24. The method set forth in claim 22 wherein said step of describing first, second and third narrowband color-component values of said frame or succession of frames in digitized sampled-data terms is carried out so that said first narrowband color-component values are narrowband luminance values.

25. A method of packing a video random-access memory with a frame or succession of frames of video data comprising the steps of:

describing the luminance detail values of said frame or succession of frames in digitized sampled-data terms;

arranging the bits of each of the digitized sampled-data luminance detail values in a prescribed serial order according to their significance;

stringing the digitized sampled-data luminance detail values in prescribed serial order in accordance with a raster scan order of display, to generate a luminance detail bit stream;

dividing the luminance detail bit stream into lengths not longer than the number of bits per row of said video random-access memory, for writing into respective rows of said video random-access memory;

describing first, second and third sets of narrowband color-component values of said frame or succession of frames in digitized sampled-data terms;

arranging the bits of each set of the digitized sampled-data narrowband color-component values in a prescribed serial order according to their significance;

stringing the digitized sampled-data narrowband color-component values in said first set in prescribed serial order in accordance with a raster scan order of display, to generate a first narrowband color-component bit stream;

stringing the digitized sampled-data narrowband color-component values in said second set in prescribed serial order in accordance with a raster scan order, to generate a second narrowband color-component bit stream;

stringing the digitized sampled-data narrowband color-component values in said third set in prescribed serial order in accordance with a raster scan of display, to generate a third narrowband color-component bit stream; and dividing the first, second and third narrowband color-component chrominance bit streams into lengths not longer than the number of bits per row of said video random-access memory, for writing into respective further rows of said video random-access memory.

26. The method of claim 25 including the step of:

writing successive lengths of said luminance detail bit stream in a first set of successive rows of said video random-access memory.

27. The method of claim 26 including the steps of:

writing successive lengths of said first narrowband color-component bit stream in a second set of successive rows of said video random-access memory;

writing successive lengths of said second narrowband color-component bit stream in a third set of successive rows of said video random-access memory; and writing successive lengths of said third narrowband color-component bit stream in a fourth set of successive rows of said video random-access memory, said first and second and third and fourth sets of successive rows sharing no row.

28. The method set forth in claim 27 wherein said step of describing first, second and third narrowband color-component values of said frame or succession of frames in digitized sampled-data terms is carried out so that said first narrowband color-component values are narrowband red color-component values, said second narrowband color-component values are narrowband green color-component values, and said third narrowband color-component values are narrowband blue color-component values.

29. The method set forth in claim 27 wherein said step of describing first, second and third narrowband color-component values of said frame or succession of frames in digitized sampled-data terms is carried out so that said first narrowband color-component values are narrowband luminance values.

30. The method of claim 25 including the step of:
cyclically writing successive lengths of said luminance detail bit stream, said first narrowband color-component bit stream, said second narrowband color-component bit stream and said third narrowband color-component bit stream in successive rows of said video random-access memory.

31. The method set forth in claim 30 wherein said step of describing first, second and third narrowband color-component values of said frame or succession of frames in digitized sampled-data terms is carried out so that said first narrowband color-component values are narrowband red color-component values, said second narrowband color-component values are narrowband green color-component values, and said third narrowband color-component values are narrowband blue color-component values.

32. The method set forth in claim 30 wherein said step of describing first, second and third narrowband color-component values of said frame or succession of frames in digitized sampled-data terms is carried out so that said first narrowband color-component values are narrowband luminance values.

33. A method of packing a video random-access memory with a frame or succession of frames of color video data comprising the steps of:
describing the luminance detail values of said frame or succession of frames in digitized sampled-data terms;
arranging the bits of each of the digitized sampled-data luminance detail values in a prescribed serial order according to their significance;
stringing the digitized sampled-data luminance detail values in prescribed serial order in accordance with a raster scan order of display, to generate a luminance detail bit stream;
dividing the luminance detail bit stream into lengths not longer than the number of bits per row of said video random-access memory;
generating first, second and third sets of narrowband color-component values describing said frame or succession of frames in digitized sampled-data terms, of equal sampling density in image space;
arranging the bits of each of the digitized sampled-data narrowband color-component values in a prescribed serial order according to their significance;
arranging each of said first, second and third sets of narrowband color-component values in accordance with a raster scan order of display;
cyclically selecting ones of said first, second and third sets of narrowband color-component values as so arranged, on a pixel-by-pixel basis, to generate a narrowband bit stream; and
dividing the narrowband bit stream into lengths not longer than the number of bits per row of said video random-access memory, for writing into respective further rows of said video random-access memory.

34. The method set forth in claim 33 wherein said step of describing first, second and third narrowband color-component values of said frame or succession of frames in digitized sampled-data terms is carried out so that said first narrowband color-component values are narrowband red color-component values, said second narrowband color-component values are narrowband green color-component values, and said third narrowband color-component values are narrowband blue color-component values.

35. The method set forth in claim 33 wherein said step of describing first, second and third narrowband color-component values of said frame or succession of frames in digitized sampled-data terms is carried out so that said first narrowband color-component values are narrowband luminance values.

36. A method of packing a video random-access memory with a frame or succession of frames of color video data comprising the steps of:
describing the luminance detail values of said frame or succession of frames in digitized sampled-data terms;
arranging the bits of each of the digitized sampled-data luminance detail values in a prescribed serial order according to their significance;
stringing the digitized sampled-data luminance detail values in prescribed serial order in accordance with a raster scan order of display, to generate a luminance detail bit stream;
dividing the luminance detail bit stream into lengths not longer than the number of bits per row of said video random-access memory;
generating first, second and third sets of narrowband color-component values describing said frame or succession of frames in digitized sampled-data terms, of equal sampling density in image space;
arranging the bits of each of tne digitized sampled-data narrowband color-component values in a prescribed serial order according to their significance;
arranging each of said first, second and third sets of narrowband color-component values in accordance with a raster scan order of display;
cyclically selecting ones of said first, second and third sets of narrowband color-component values as so arranged, on a line-by-line basis, to generate a narrowband bit stream; and
dividing the narrowband bit stream into lengths not longer than the number of bits per row of said video random-access memory, for writing into respective further rows of said video random-access memory.

37. The method set forth in claim 36 wherein said step of describing first, second and third narrowband color-component values of said frame or succession of frames in digitized sampled-data terms is carried out so that said first narrowband color-component values are narrowband red color-component values, said second narrowband color-component values are narrowband green color-component values, and said third narrowband color-component values are narrowband blue color-component values.

38. The method set forth in claim 36 wherein said step of describing first, second and third narrowband color-component values of said frame or succession of frames in digitized sampled-data terms is carried out so that said first narrowband color-component values are narrowband luminance values.

* * * * *